(12) United States Patent
Harada et al.

(10) Patent No.: US 8,188,987 B2
(45) Date of Patent: May 29, 2012

(54) DISPLAY AND IMAGING APPARATUS AND OBJECT DETECTING METHOD

(75) Inventors: Tsutomu Harada, Kanagawa (JP);
Kazunori Yamaguchi, Kanagawa (JP);
Mitsuru Tateuchi, Kanagawa (JP);
Ryoichi Tsuzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 12/392,155

(22) Filed: Feb. 25, 2009

(65) Prior Publication Data

US 2009/0213095 A1 Aug. 27, 2009

(30) Foreign Application Priority Data

Feb. 27, 2008 (JP) ................................ P2008-046855

(51) Int. Cl.
*G06F 3/042* (2006.01)
(52) U.S. Cl. ......... 345/175; 345/173; 345/176; 382/103
(58) Field of Classification Search .................. 345/173, 345/175, 176
See application file for complete search history.

(56) References Cited

U.S. PATENT DOCUMENTS

| | | | | |
|---|---|---|---|---|
| 2006/0146038 A1* | 7/2006 | Park et al. | ...................... | 345/173 |
| 2006/0170658 A1* | 8/2006 | Nakamura et al. | ............ | 345/173 |
| 2006/0244734 A1* | 11/2006 | Hill et al. | ...................... | 345/173 |
| 2007/0182723 A1* | 8/2007 | Imai et al. | ...................... | 345/175 |
| 2008/0055266 A1* | 3/2008 | Harada et al. | ................. | 345/173 |

* cited by examiner

*Primary Examiner* — Adam R Giesy
(74) *Attorney, Agent, or Firm* — Frommer, Lawrence & Haug LLP; William S. Frommer; Thomas F. Presson

(57) ABSTRACT

A displaying and imaging apparatus includes a displaying and imaging panel, a generating unit for generating a difference image between a reflection light using image and a shadow image obtained from the displaying and imaging panel, and an image processing unit for obtaining information of at least one of position, shape, and size of the adjacent object on the basis of the difference image. The generating unit generates, on the basis of a plurality of images obtained at timings different from each other, which are one of the reflection light using image or the shadow image, one interpolation image corresponding to the one of images obtained at a timing different from those of the plurality of images, and generates the difference image by the difference between the interpolation image and the other one of the reflection light using image and the shadow image.

14 Claims, 29 Drawing Sheets

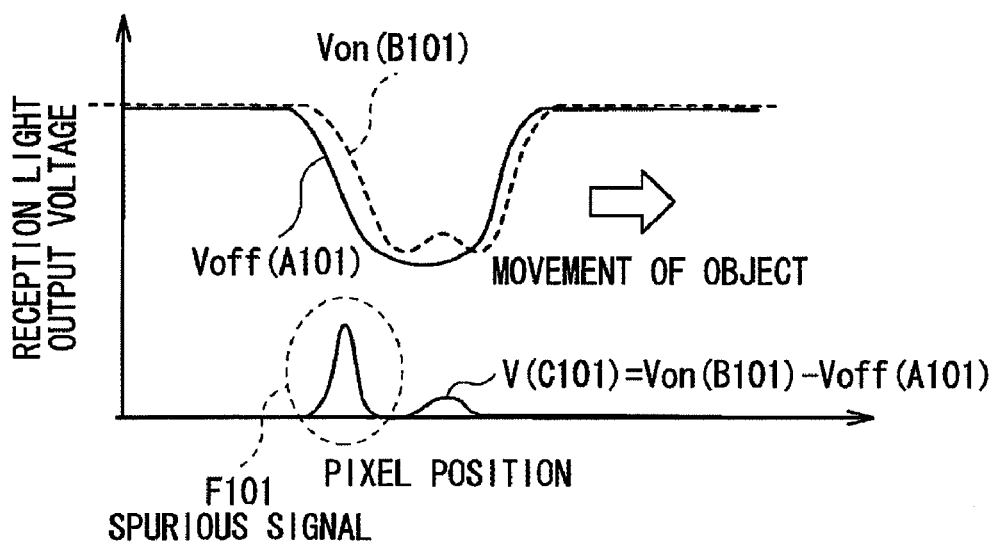
FIG. 13
RELATED ART
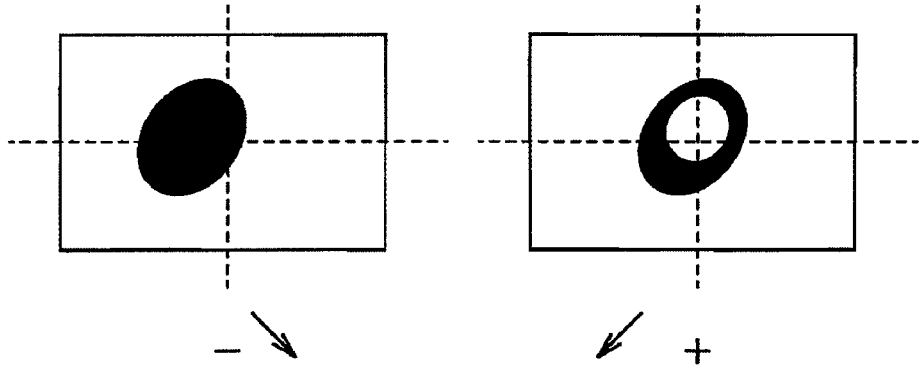
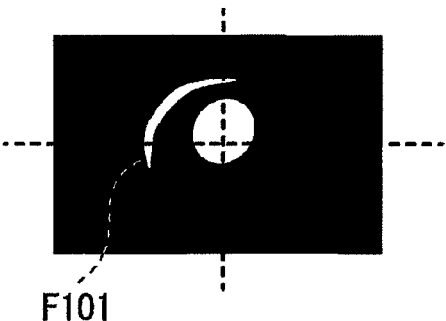
FIG. 14
RELATED ART

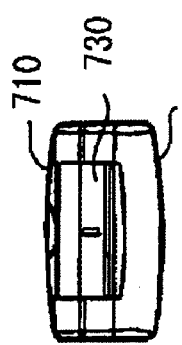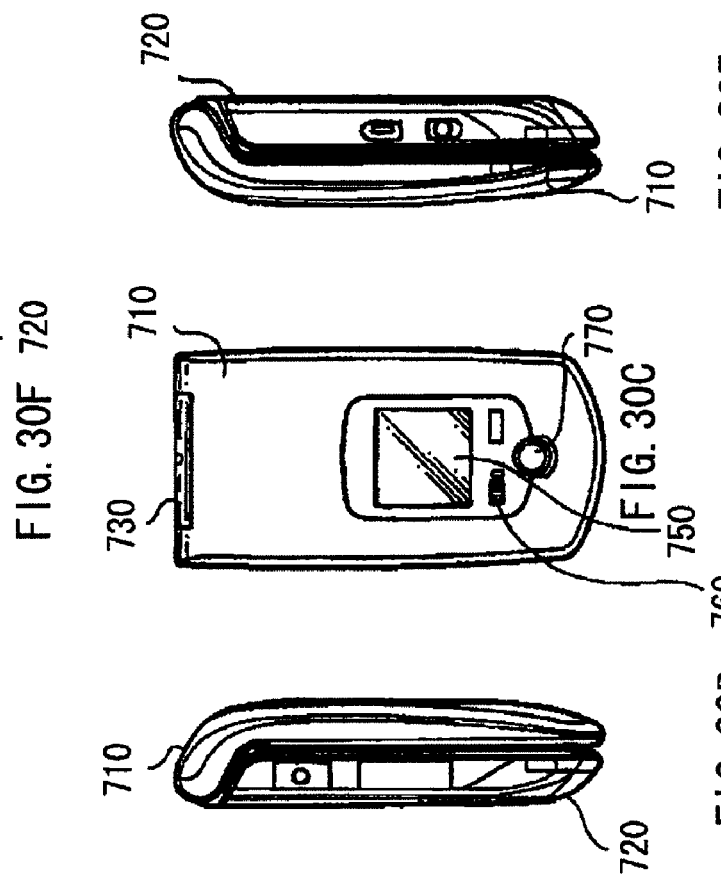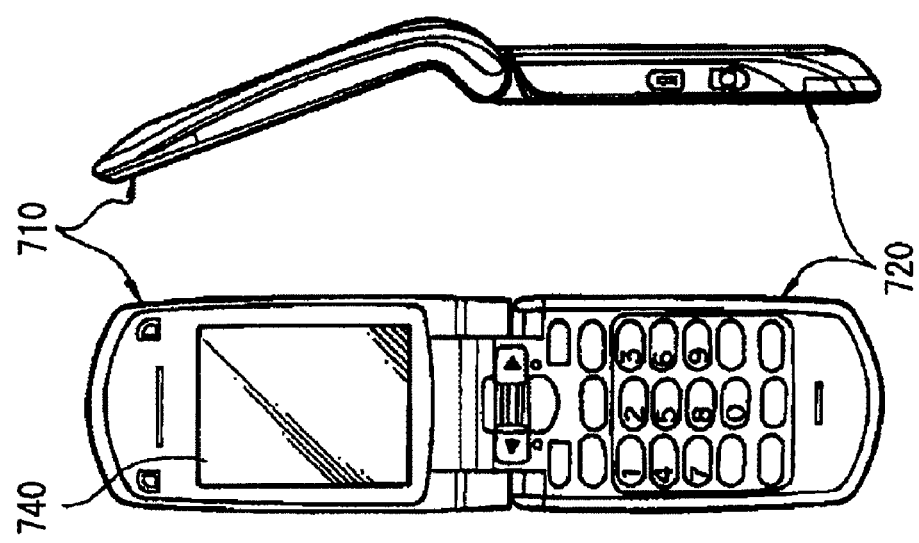

DISPLAY AND IMAGING APPARATUS AND OBJECT DETECTING METHOD

CROSS REFERENCE TO RELATED APPLICATIONS

The present invention contains subject matter related to Japanese Patent Application JP 2008-046855 filed in the Japanese Patent Office on Feb. 27, 2008, the entire contents of which being incorporated herein by reference.

BACKGROUND OF THE INVENTION

1. Field of the Invention

The present invention relates to a displaying and imaging apparatus for obtaining information such as position of an object which comes into contact with or comes close to a panel, and an object detecting method for obtaining such information.

2. Description of the Related Art

Hitherto, techniques for detecting the position of an object which comes into contact with or comes close to a display plane of a display apparatus are known. Among them, a typified and popularized technique is a display apparatus having a touch panel.

There are touch panels of various types, and a popularized one is a touch panel of a type of detecting capacitance. In this type, when a touch panel is touched with a finger, a change in surface charge of the panel is captured to detect the position of an object or the like. By using such a touch panel, the user may perform operation intuitively.

The applicant of the present invention has proposed a display apparatus provided with a display unit (displaying and imaging panel) having a display function of displaying an image and an image pickup function (detecting function) of imaging (detecting) an object in Japanese Unexamined Patent Application Publication Nos. 2004-127272 and 2006-276223.

SUMMARY OF THE INVENTION

When a display apparatus described in Japanese Unexamined Patent Application Publication No. 2004-127272 is used, in the case where an object such as a finger comes into contact with or comes close to a displaying and imaging panel, by using reflection light of irradiation light from the displaying and imaging panel, which is reflected by the object, the position or the like of the object may be detected on the basis of an image captured. Therefore, by using the display apparatus, without providing a part such as a touch panel on the displaying and imaging panel, the position or the like of an object can be detected with a simple configuration.

However, usage of reflection light reflected from the object may cause a problem of characteristic variations or the like in external light or a light receiving element. To be concrete, since luminance of light received changes according to brightness of external light, there is the case that it becomes difficult to detect the position or the like of the object on the basis of a captured image. There is also a case that characteristic variations of a light receiving element become fixed noise, and it becomes difficult to detect the position or the like of the object on the basis of a captured image.

To address the problem, Japanese Unexamined Patent Application Publication No. 2006-276223 discloses a technique of eliminating the influence of the above-described external light or fixed noise by detecting the difference between an image obtained in a light-on state of irradiation light from a displaying and imaging panel (an image obtained by using reflection light of illumination light) and an image obtained in a light-off state. It is considered that, by the technique, the position or the like of an object may be detected without being influenced by external light and fixed noise.

However, under actual use circumstances, there is time difference between an image obtained in the light-on state and an image obtained in the light-off state. Therefore, for example, when the object moves at high speed above/on the displaying and imaging panel, due to the time difference, a positional deviation occurs between the image obtained in the light-on state and the image obtained in the light-off state. When such a positional deviation occurs, at the time of detecting the difference between the two images, spurious signal occurs in another position in addition to an inherent signal corresponding to the position of the object. There is consequently the case that, due to the existence of such spurious signal, it becomes difficult to stably detect an object. The area where the spurious signal occurs increases when the motion of an object is fast. There is the tendency that the stronger the external light is, the stronger the spurious signal is.

In the techniques of related art, it is difficult to stably detect an object which comes into contact with or comes close to a panel regardless of the use circumstances, and there is room for improvement.

It is therefore desirable to provide a displaying and imaging apparatus and an object detecting method capable of stably detecting an object regardless of use circumstances.

A displaying and imaging apparatus as an embodiment of the present invention includes: a displaying and imaging panel having an image displaying function and an image capturing function; a generating unit for generating a difference image between a reflection light using image and a shadow image, the reflection light using image being obtained by imaging of an adjacent object by the displaying and imaging panel using reflection light of irradiation light emitted from the displaying and imaging panel, and the shadow image being obtained by imaging shadow of the adjacent object by the displaying and imaging panel; and an image processing unit for obtaining information of at least one of position, shape, and size of the adjacent object on the basis of the difference image. The generating unit generates, on the basis of a plurality of images obtained at timings different from each other along time base, which are one of the reflection light using image or the shadow image, one interpolation image corresponding to the one of images obtained at a timing different from those of the plurality of images, and generates the difference image by the difference between the interpolation image and the other one of the reflection light using image and the shadow image. The "irradiation light" includes not only display light emitted from the displaying and imaging panel but also light emitted from another light source (for example, an infrared light source or the like) on the displaying and imaging panel. The "adjacent object" denotes not only an adjacent object as literally meaning but also an object in a contact state.

An object detecting method as an embodiment of the present invention includes: capturing an image of a shade of an adjacent object by a displaying and imaging panel having an image displaying function and an image capturing function; capturing an image of the adjacent object by the displaying and imaging panel using reflection light of irradiation light emitted from the displaying and imaging panel; generating a difference image between a reflection light using image obtained by imaging using the reflection light of the irradiation light and a shadow image obtained by imaging of the shadow of the adjacent object; obtaining information of at least one of position, shape, and size of the adjacent object on the basis of the difference image; and at the time of generating the difference image, on the basis of a plurality of images obtained at timings different from each other along time base, the plurality of images being one of the reflection light using images and the shadow images, generating one interpolation image corresponding to the one of the images obtained at a timing different from those of the plurality of images, and generating the difference image by the difference between the interpolation image and the other one of the reflection light using image and the shadow image.

In the displaying and imaging apparatus and the object detecting method as an embodiment of the invention, by capturing an image of a shade of an adjacent object by a displaying and imaging panel, a shade image is obtained. By using reflection light of irradiation light of the displaying and imaging panel by the displaying and imaging panel, a reflection light using image is obtained. A difference image between the reflection light using image and the shade image is generated. On the basis of the difference image, information on at least one of the position, shape, and size of the adjacent object is obtained. At the time of generating the difference image, on the basis of a plurality of images obtained at timings different from each other along time base which are one of the reflection light using images and the shade images, one interpolation image corresponding to the one of images obtained at a timing different from those of the plurality of images is generated. By the difference between the interpolation image and the other image which is the reflection light using image or the shade image, the difference image is generated. On the basis of the difference image using the interpolation image, information on at least one of the position, shape, and size of the adjacent object is obtained. Consequently, for example, even in the case where the adjacent object moves on/above the displaying and imaging panel, occurrence of spurious signal in the difference image is suppressed.

In the displaying and imaging apparatus as an embodiment of the present invention, in the case where the one of the images is the shadow image and the other image is the reflection light using image, the generating unit generates, on the basis of a plurality of shadow images obtained at timings different from each other along time base, one interpolation image corresponding to a shadow image obtained at a timing different from those of the plurality of shadow images, and generates the difference image on the basis of the difference between the interpolation image and the reflection light using image.

In the displaying and imaging apparatus and the object detecting method as embodiments of the present invention, at the time of generating a difference image between a reflection light using image and a shadow image, on the basis of a plurality of images, which are one of reflection light using images and shadow images, captured at timings different from one another along the time base, one interpolation image corresponding to the one of the images obtained at a timing different from any of the plurality of images is generated. The difference image is generated by the difference between the interpolation image and the other image out of the reflection light using image and the shadow image. Consequently, for example, even in the case where the adjacent object moves on/above the displaying and imaging panel, occurrence of spurious signal in the difference image may be suppressed. Therefore, regardless of the use circumstances, an object may be stably detected.

Other and further objects, features and advantages of the invention will appear more fully from the following description.

BRIEF DESCRIPTION OF THE DRAWINGS

FIG. 13 is a characteristic diagram for explaining the difference image extracting process in a comparative example.

FIG. 14 is a schematic diagram for explaining the difference image extracting process in the comparative example.

FIG. 30A is a front view showing an open state of an application example 5, FIG. 30B is a side view, FIG. 30C is a front view in a closed state, FIG. 30D is a left side view, FIG. 30E is a right side view, FIG. 30F is a top view, and FIG. 30G is a bottom view.

DETAILED DESCRIPTION OF THE PREFERRED EMBODIMENTS

Best modes for carrying out the present invention (hereinbelow, simply called embodiments) will be described in detail hereinbelow with reference to the drawings.

First Embodiment

Figure 1:
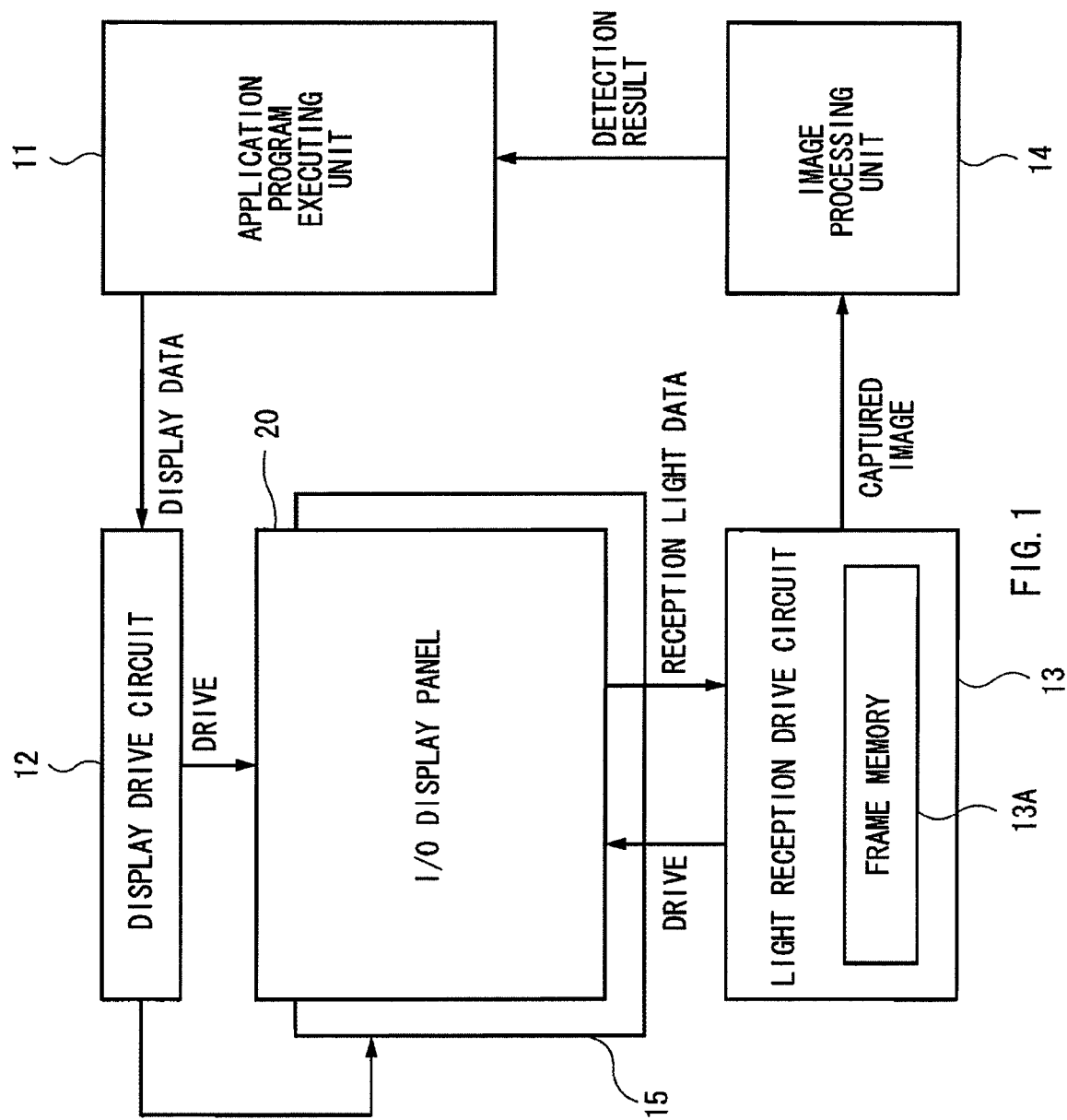
FIG. 1 is a block diagram showing the configuration of a displaying and imaging apparatus as a first embodiment of the present invention.

FIG. 1 shows a general configuration of a displaying and imaging apparatus as a first embodiment of the present invention. The displaying and imaging apparatus has an I/O display panel 20, a backlight 15, a display drive circuit 12, a light reception drive circuit 13, an image processing unit 14, and an application program executing unit 11.

The I/O display panel 20 is made of a liquid crystal panel (LCD (Liquid Crystal Display)) in which a plurality of pixels are disposed in a matrix on the entire surface. The I/O display panel 20 has the function (display function) of displaying an image of a predetermined figure, character, or the like based on display data while performing line-sequential operation and, as will be described later, has the function (imaging function) of imaging an object which comes into contact with or comes close to the I/O display panel 20. The backlight 15 is a light source constructed by, for example, disposing a plurality of light emitting diodes, and for displaying and detecting an image on the I/O display panel 20. The backlight 15 performs on/off operation at high speed at a predetermined timing synchronized with the operation timing of the I/O display panel 20 as will be described later.

The display drive circuit 12 is a circuit for driving the I/O display panel 20 (performing the line-sequential operation) so as to display an image based on display data (so as to perform displaying operation) on the I/O display panel 20.

The light reception drive circuit 13 is a circuit for driving the I/O display panel 20 (performing the line-sequential operation) so as to obtain light reception data (so as to capture an image of the object) on the I/O display panel 20. The light reception data in each of the pixels is stored, for example, on a frame unit basis on a frame memory 13A and is output as a captured image to the image processing unit 14.

The image processing unit 14 performs a predetermined imaging process (computing process) on the basis of the captured image output from the light reception drive circuit 13, and detects and obtains information on an object which comes into contact with or comes close to the I/O display panel 20 (position coordinate data, data on the shape and size of the object, and the like). The details of the detecting process will be described later.

The application program executing unit 11 executes a process according to predetermined application software on the basis of the detection result of the image processing unit 14. For example, the detected position coordinates of the object are included in the display data, and the application program executing unit 11 displays the display data on the I/O display panel 20. The display data generated by the application program executing unit 11 is supplied to the display drive circuit 12.

Figure 2:
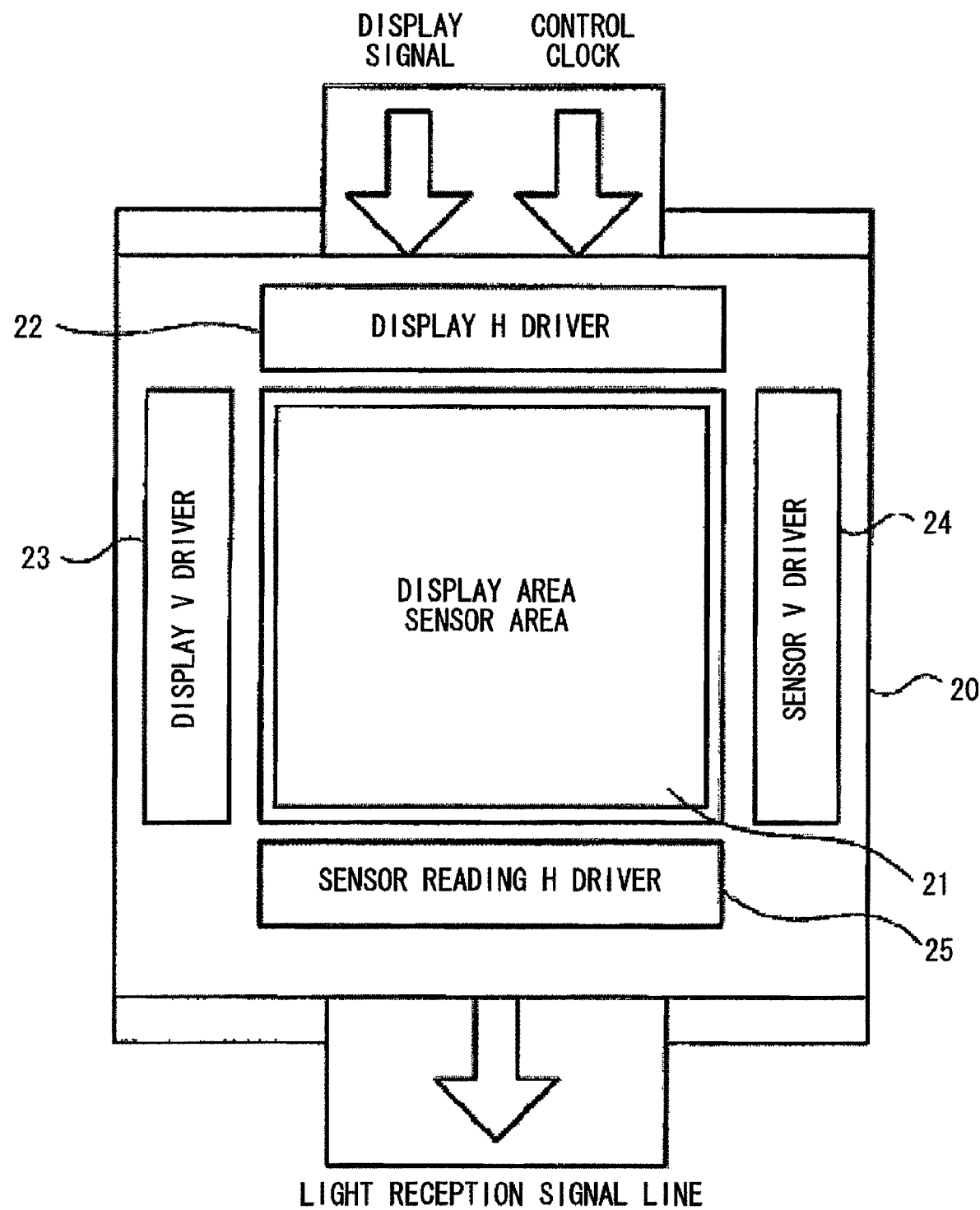
FIG. 2 is a block diagram showing an example of the configuration of an I/O display panel illustrated in FIG. 1.

Referring to FIG. 2, an example of the detailed configuration of the I/O display panel 20 will be described. The I/O display panel 20 includes a display area (sensor area) 21, a display H driver 22, a display V driver 23, a sensor reading H driver 25, and a sensor V driver 24.

The display area (sensor area) 21 is an area for emitting irradiation light (including display light and detection irradiation light from, for example, an infrared light source (not shown), the definition will be the same below) by modulating light from the backlight 15 and for capturing an image of an object which comes into contact with or comes close to the area. In the display area 21, liquid crystal elements as light emitting elements (display elements) and light receiving elements (image pickup elements) are disposed in a matrix.

The display H driver 22 line-sequentially drives the liquid crystal elements of the pixels in the display area 21 in cooperation with the display V driver 23 on the basis of a display signal for display driving and a control clock supplied from the display drive circuit 12.

The sensor reading H driver 25 line-sequentially drives the light receiving elements of the pixels in the sensor area 21 in cooperation with the sensor V driver 24 to obtain a light reception signal.

Figure 3:
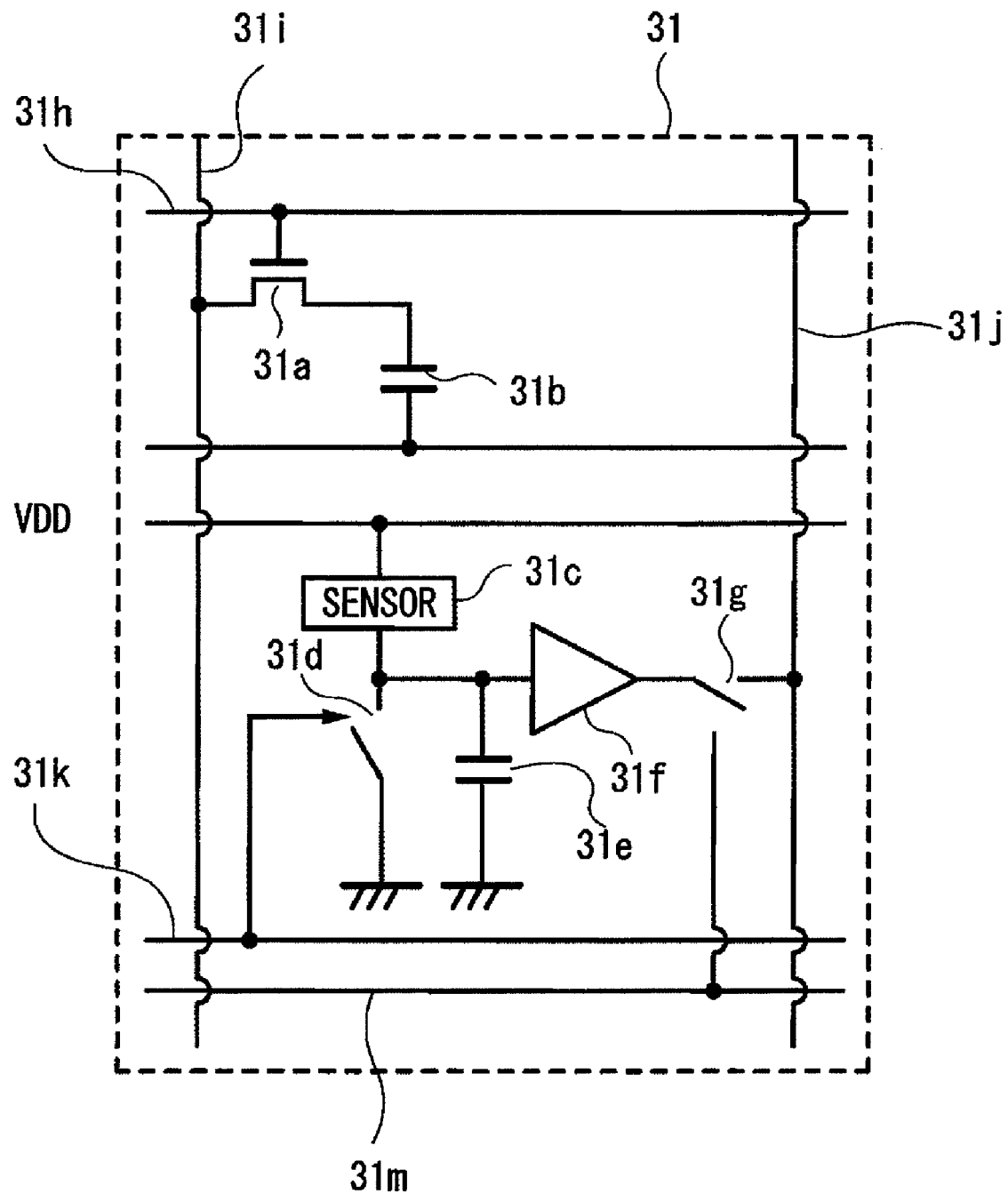
FIG. 3 is a circuit diagram showing an example of the configuration of each pixel.

Referring now to FIG. 3, an example of the detailed configuration of each pixel in the display area 21 will be described. A pixel 31 shown in FIG. 3 is constructed by a liquid crystal element as a display element and a light receiving element.

Concretely, on the display element side, a switching element 31a made by a thin film transistor (TFT) or the like is disposed at an intersecting point between a gate electrode 31h extending in the horizontal direction and a drain electrode 31i extending in the vertical direction, and a pixel electrode 31b including liquid crystal is disposed between the switching element 31a and an opposed electrode. The switching element 31a performs on/off operation on the basis of a drive signal supplied via the gate electrode 31h. On the basis of a display signal supplied via the drain electrode 31i in the on state, pixel voltage is applied to the pixel electrode 31b, and a display state is set.

On the other hand, on the side of the light receiving element adjacent to the display element, a light reception sensor 31c made by, for example, a photodiode is disposed, and a power source voltage VDD is supplied. A reset switch 31d and a capacitor 31e are connected to the light reception sensor 31c. While being reset by the reset switch 31d, charges according to the light reception amount are accumulated in the capacitor 31e. The accumulated charges are supplied to a signal output electrode 31*j* via a buffer amplifier 31*f* and is output to the outside at a timing a read switch 31*g* is turned on. The on/off operation of the reset switch 31*d* is controlled by a signal supplied from a reset electrode 31*k*. The on/off operation of the read switch 31*g* is controlled by a signal supplied from a read control electrode 31*m*.

Figure 4:
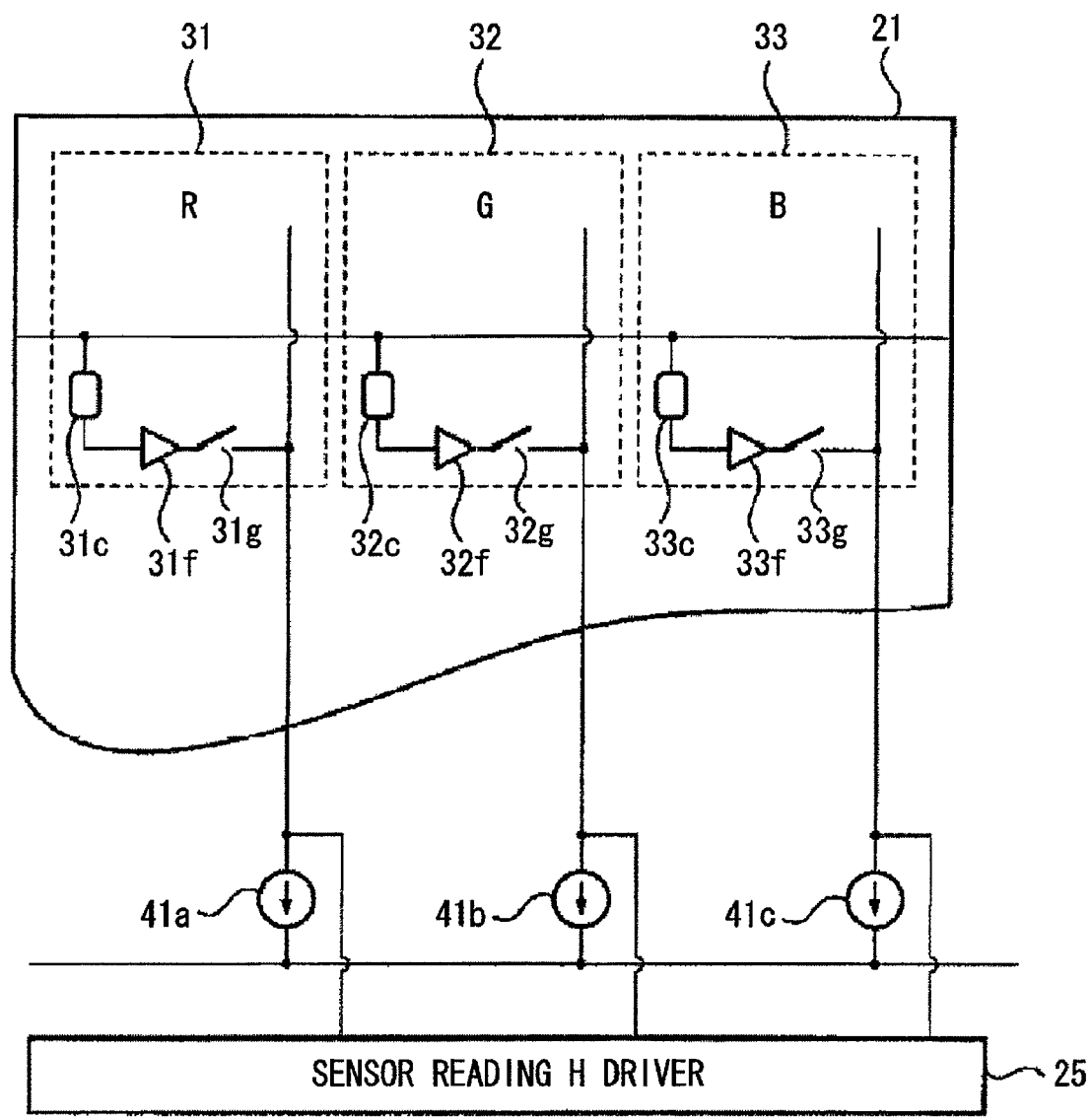
FIG. 4 is a circuit diagram for explaining a connection relation between pixels and a sensor reading H driver.

Referring to FIG. 4, the connection relation between the pixels in the display area 21 and the sensor reading H driver 25 will be described. In the display area 21, a pixel 31 for red (R), a pixel 32 for green (G), and a pixel 33 for blue (B) are aligned.

The charges accumulated in the capacitors connected to the light reception sensors 31*c*, 32*c*, and 33*c* in the pixels are amplified by buffer amplifiers 31*f*, 32*f*, and 33*f* and supplied to the sensor reading H driver 25 via the signal output electrode at a timing when read switches 31*g*, 32*g*, and 33*g* are turned on. Constant current sources 41*a*, 41*b*, and 41*c* are connected to the signal output electrodes, and a signal corresponding to the light reception amount is detected by the sensor reading H drive 25 with high sensitivity.

The operation of the displaying and imaging apparatus of the embodiment will be described in detail.

First, the basic operation of the displaying and imaging apparatus, that is, image displaying operation and object imaging operation will be described.

In the displaying and imaging apparatus, a drive signal for display is generated in the display drive circuit 12 on the basis of display data supplied from the application program executing unit 11. By the drive signal, line-sequential display drive is performed on the I/O display panel 20 and an image is displayed. The backlight 15 is also driven by the display drive circuit 12, and turn-on/off operation synchronized with the I/O display panel 20 is performed.

Figure 5:
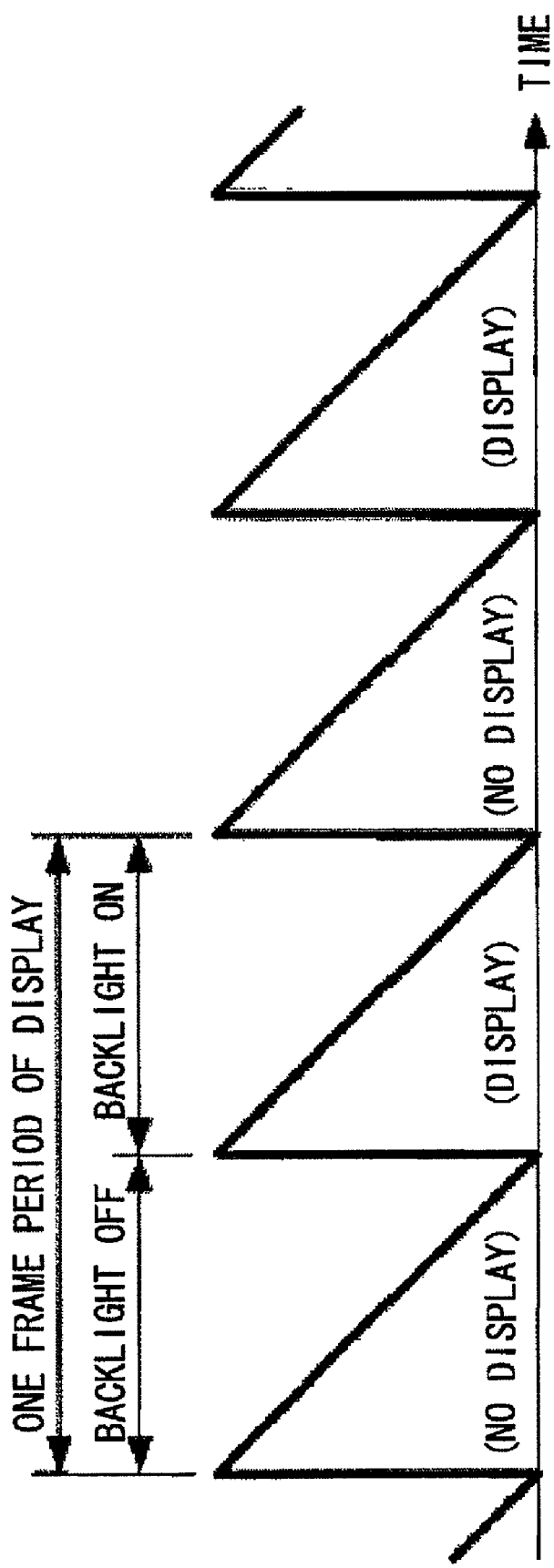
FIG. 5 is a timing chart for explaining the relation between on/off states of a backlight and a display state.

With reference to FIG. 5, the relation between the on/off state of the backlight 15 and the display state of the I/O display panel 20 will be described. In FIG. 5, the horizontal axis shows time, and the vertical axis shows a position of a line in a perpendicular direction scanned for image capturing by a light receiving element in each pixel.

First, in the case where an image is displayed, for example, in ¹⁄₆₀-second frame periods, in the first half period (¹⁄₁₂₀-second) of each frame period, the backlight 15 is turned off (off state), and no image is displayed. On the other hand, in the latter half period of each frame period, the backlight 15 is turned on (on state), a display signal is supplied to each of the pixels, and an image in the frame period is displayed.

As described above, the first half period of each frame period is a light-off period in which the irradiation light is not emitted from the I/O display panel 20. On the other hand, the latter half period of each frame period is a light-on period in which the irradiation light is emitted from the I/O display panel 20.

In the case where there is an object (such as fingertip) in contact with or close to the I/O display panel 20, by line-sequential light reception driving of the light reception drive circuit 13, an image of the object is captured by the light receiving elements in the pixels in the I/O display panel 20, and a light reception signal from each of the light receiving elements is supplied to the light reception drive circuit 13. The light reception signals of the pixels of one frame are stored in the light reception drive circuit 13 and are output as a captured image to the image processing unit 14.

The image processing unit 14 performs a predetermined image process (computing process) described below on the basis of the captured image, thereby detecting information (such as position coordinate data, data on the shape and size of the object, and the like) on the object in contact with or close to the I/O display panel 20.

Figure 6:
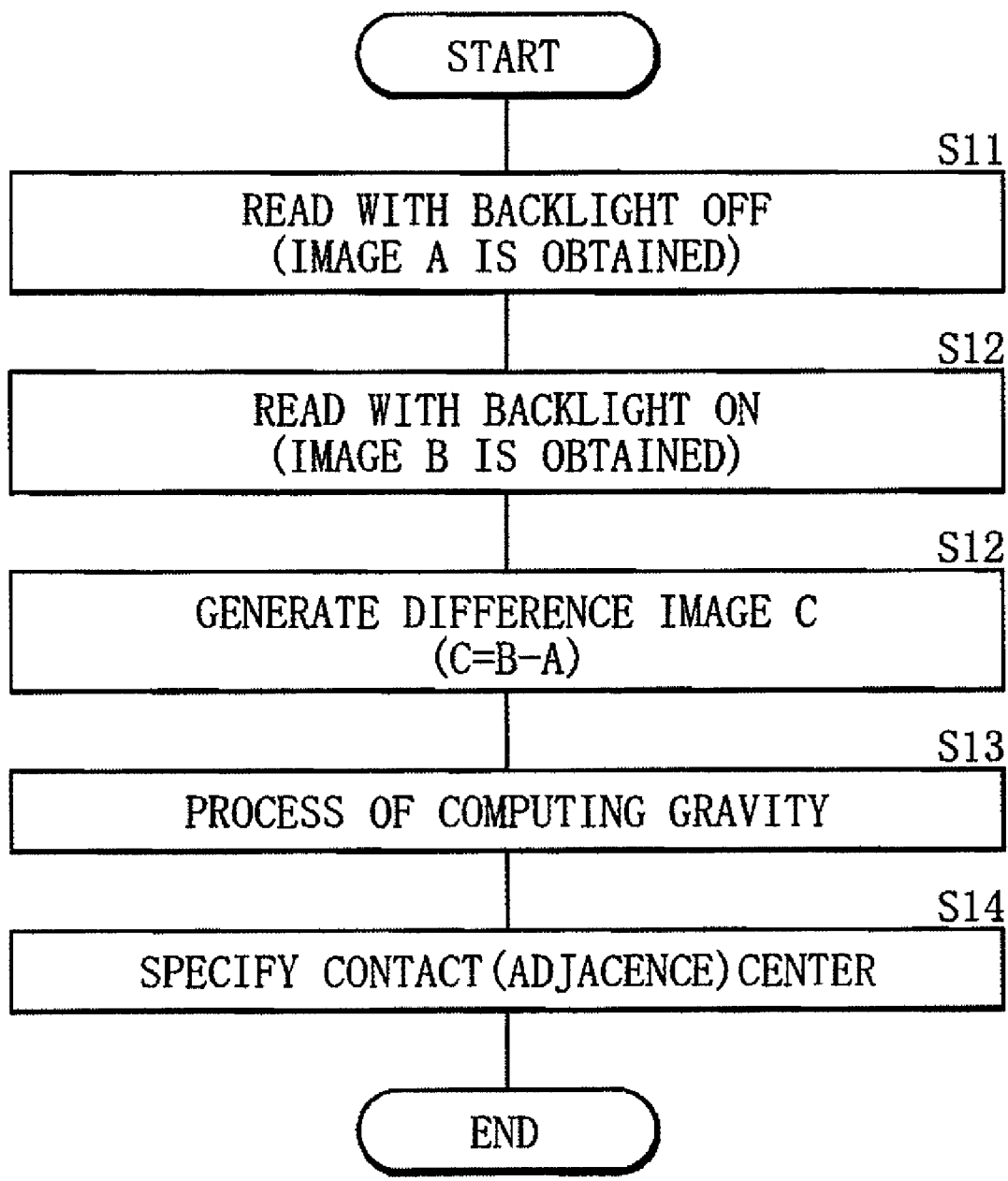
FIG. 6 is a flowchart showing difference image fingertip extracting process.
Figure 7:
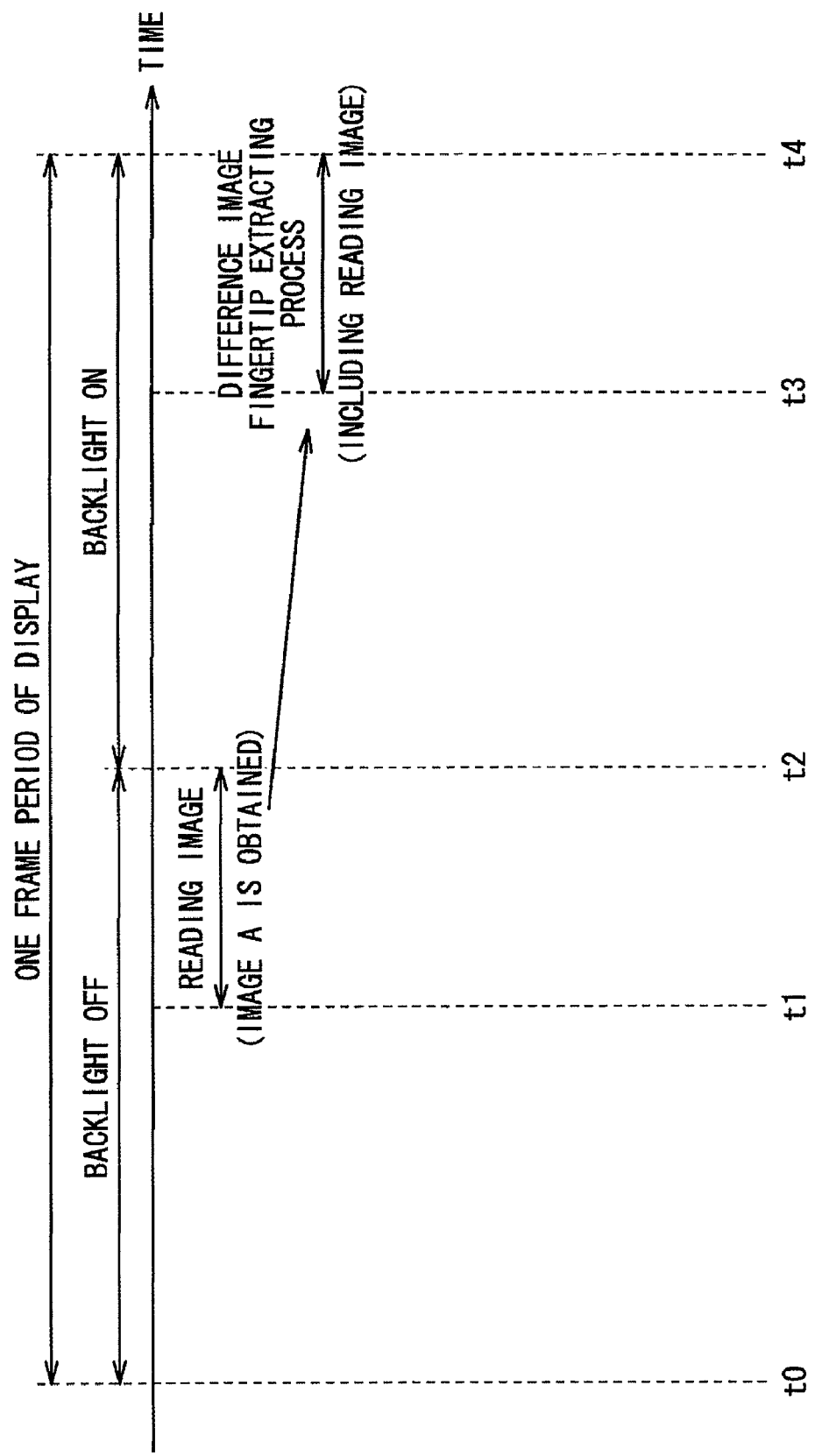
FIG. 7 is a timing chart for explaining difference image extracting process shown in FIG. 6.
Figure 8:
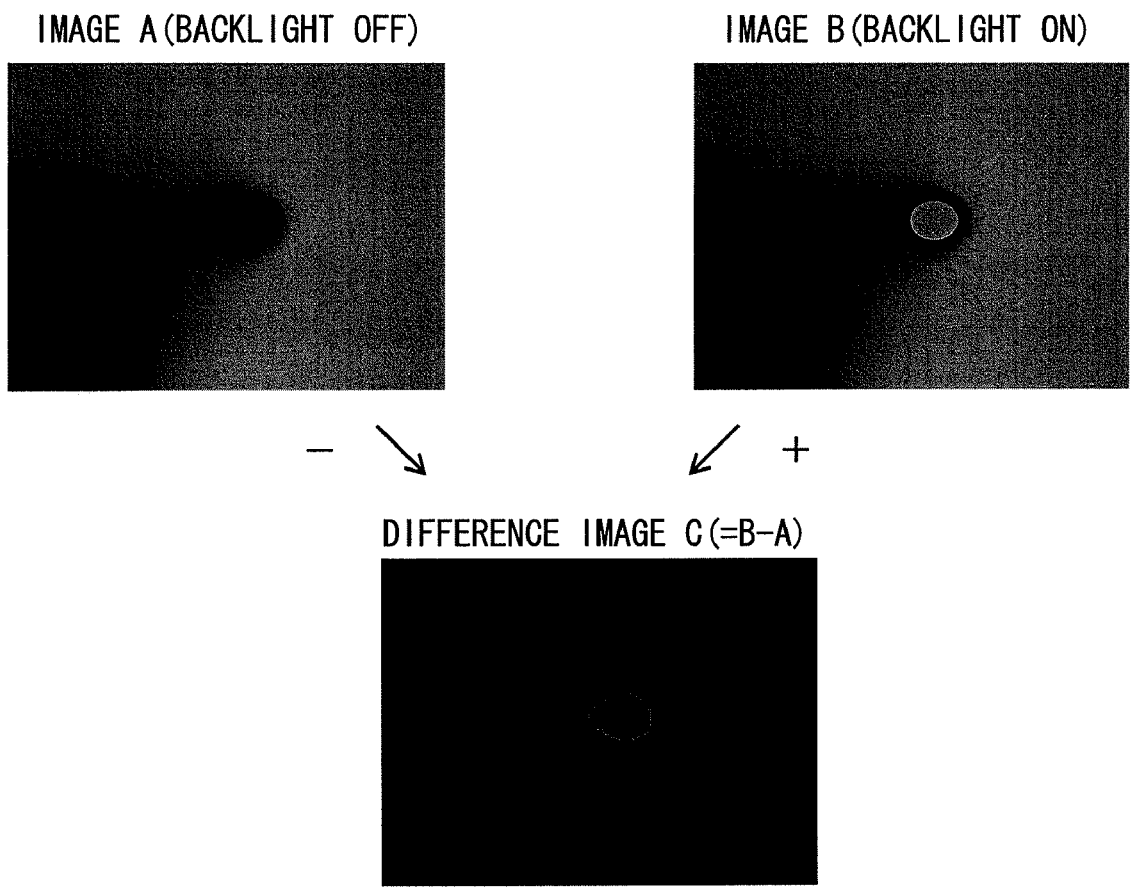
FIG. 8 is a picture configuration diagram for explaining the difference image fingertip extracting process.

With reference to FIGS. 6 to 8, 9A to 9B, 10A to 10B, 11A to 11B, and 12A to 12D, the process of extracting the object (adjacent object) such as a fingertip (fingertip extracting process) which is in contact with or close to the I/O display panel 20 by the image processing unit 14 will be described in detail. FIG. 6 is a flowchart showing the fingertip extracting process (difference image fingertip extracting process) performed by the image processing unit 14. FIG. 7 is a timing chart showing a part of the fingertip extracting process.

First, in a period in which the backlight 15 is off (light-off period) as the first half period of a display frame, the adjacent object imaging process is performed by the I/O display panel 20, and an image A (shadow image) is obtained (step S11 in FIG. 6 and the period between timings t1 and t2 in FIG. 7).

Next, in the period in which the backlight 15 is on (light-on period) as the latter half period of a display frame, the adjacent object imaging process is performed by the I/O display panel 20, an image B (reflection light using image that uses reflection light of irradiation light) is obtained (step S12 in FIG. 6 and the period between timings t3 and t4 in FIG. 7).

The image processing unit 14 generates a difference image C between the image B and the image A (shadow image) captured in the period in which the backlight 15 is off (light-off period) (step S13 in FIG. 6 and the period between the timing t3 and t4 in FIG. 7).

The image processing unit 14 performs computing process for determining the center of gravity of the generated difference image (step S14), and specifies the contact (adjacence) center (step S15). The adjacent object detection result is output from the image processing unit 14 to the application program executing unit 11, and the difference image fingertip extracting process by the image processing unit 14 is finished.

As described above, in the difference image fingertip extracting process, the fingertip extracting process is performed on the basis of the difference image C between the image B using reflection light of irradiation light and the image A using external (environment light) without using the irradiating light. Consequently, the influence of brightness of external light is removed as shown in an example of a photographic image of the difference image C shown in FIG. 8. The adjacent object is detected without being influenced by the brightness of external light. At the same time with elimination of external light, fixed noise caused by variations in the characteristics of the light receiving elements may be also removed.

Figure 9A:
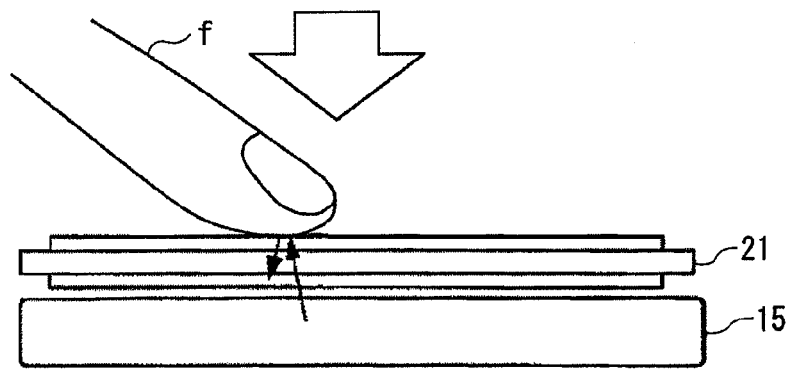
FIGS. 9A and 9B are diagrams for explaining the difference image fingertip extracting process in the case where external light is bright.
Figure 9B:
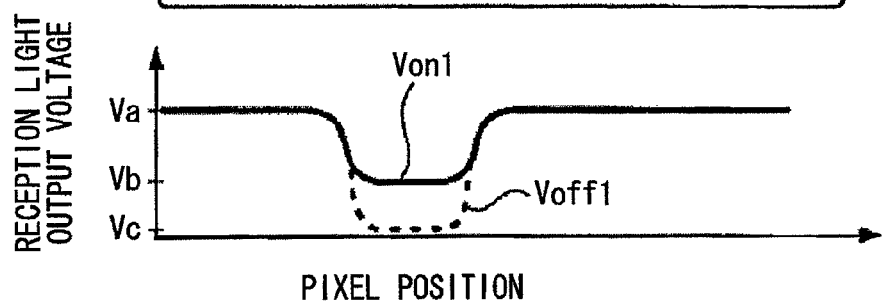

Concretely, for example, as shown in the cross section of FIG. 9A, in the case where incident external light is strong, reception light output voltage Von1 in a state where the backlight 15 is on has a voltage value Va corresponding to brightness of the external light in the place other than the finger touch place as shown in FIG. 9B. In the finger touch place, the reception light output voltage Von1 drops to a voltage value Vb corresponding to reflectance of reflection of light from the backlight by the surface of the object (finger) touched. On the other hand, a reception light output voltage Voff1 in a state where the backlight 15 is turned off has the voltage value Va corresponding to the brightness of the external light in the place other than the finger touch place. However, in the finger touch place, external light is interrupted, so that the reception light output voltage Voff1 drops to a very-low-level voltage value Vc.

Figure 10A:
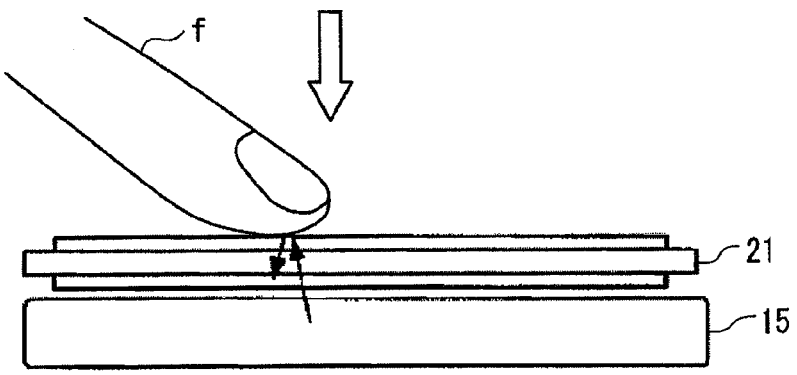
FIGS. 10A and 10B are diagrams for explaining the difference image fingertip extracting process in the case where external light is dark.
Figure 10B:
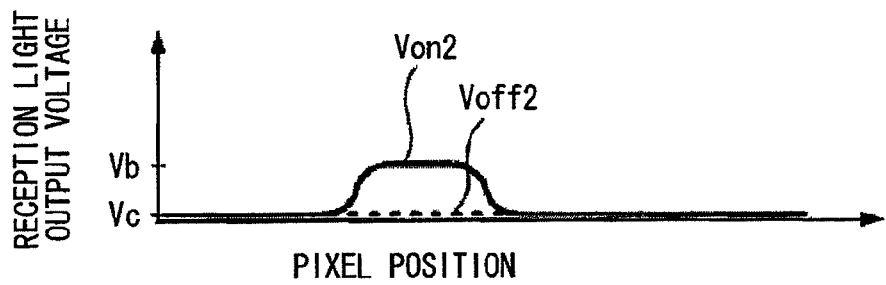

As shown in the cross section of FIG. 10A, in a state where incident external light is weak (hardly exists), a reception light output voltage Von2 in a state where the backlight 15 is on comes to have a very-low-level voltage value Vc since there is no external light in place other than the finger touch place as shown in FIG. 10B. In the finger touch place, the voltage increased to have a voltage value Vb corresponding to reflectance of reflecting light from the back light in the surface of the object (finger) touched. In contrast, the reception light output voltage Voff2 in a state where the backlight 15 is off remains to have the very-low-level voltage value Vc in both of the finger touch place in the other place.

As understood by comparison between FIGS. 9A to 9B, and 10A to 10B, in a place where nothing touches in the display area 21 of the panel, the reception light output voltage in the case where there is external light and that in the case where there is no external light are largely different from each other. However, in a place where the finger touches, regardless of external light, a voltage value Vb when the backlight is on and a voltage value Vc when the backlight is off are almost the same.

Therefore, the difference between the voltage in the light-on state of the backlight 15 and that in the light-off state is detected. A place where there is a predetermined difference or more like the difference between the voltage values Vb and Vc may be determined as a contact place or a place where the object is close. Even in the case where external light incident on the panel is strong and the case where external light hardly exists, contact or an object close state may be detected excellently under uniform conditions.

Figure 11A:
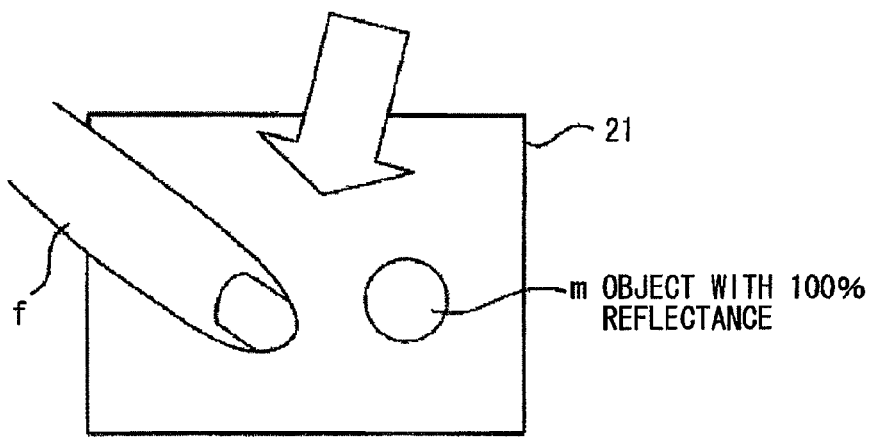
FIGS. 11A and 11B are diagrams for explaining a dynamic range of a light reception signal in the difference image fingertip extracting process.
Figure 11B:
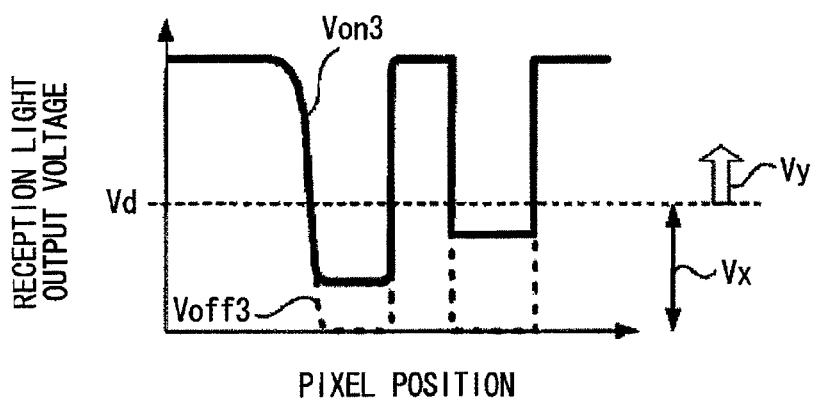
Figure 12A:
FIGS. 12A to 12D are picture configuration diagrams for explaining the difference image fingertip extracting process in the case where a plurality of fingertips to be detected simultaneously exist.
Figure 12B:
Figure 12C:
Figure 12D:
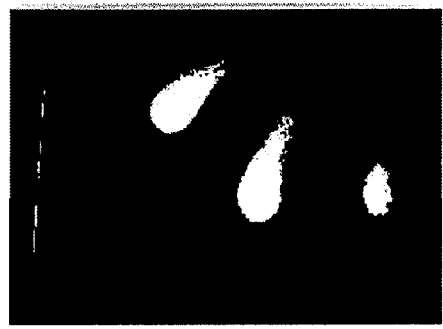
Figure 15:
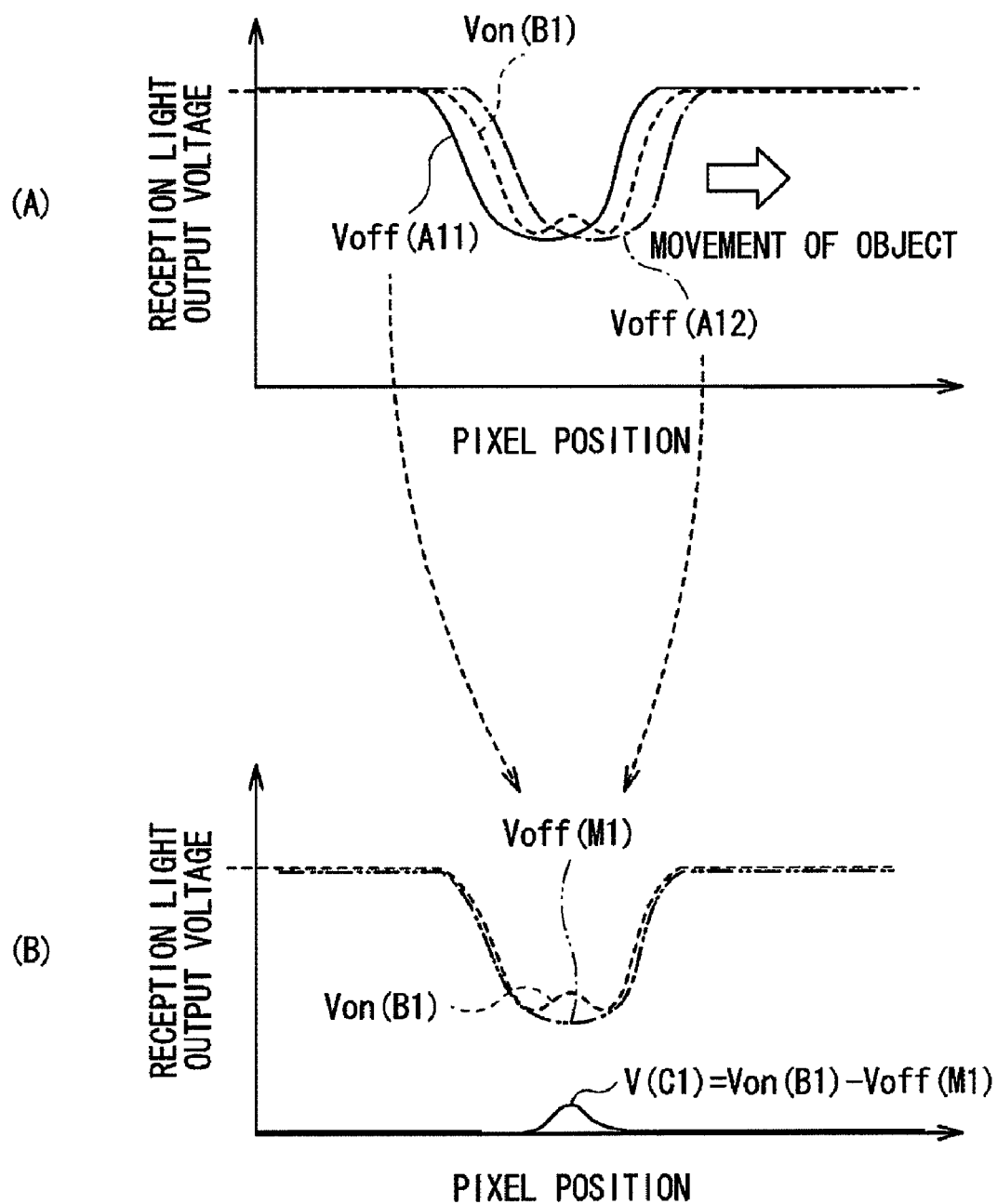
FIG. 15 is a characteristic diagram for explaining the difference image fingertip extracting process in a first embodiment.

As shown in FIGS. 11A and 11B, a dynamic range necessary for detecting the reception light output voltage is determined as follows. FIG. 11A shows a contact state of the display area 21 in the panel. The surface of the panel is touched with a finger "f" and a circular object "m" whose reflectance is almost 100% is placed on the display area 21. In this state, the reception light output voltage in a line for scanning both the finger "f" and the object "m" is as shown in FIG. 11B. In FIG. 11B, voltage Von3 is a reception light output voltage in a state where the backlight is on, and voltage Voff3 is a reception light output voltage in a state where the backlight is off.

As shown in FIG. 11B, in a place where the object "m" whose reflectance is almost 100% exists, a voltage higher than the voltage Vd detected when the backlight is on is at a level Vy which does not have to be measured. A range Vx equal to or lower than the level Vy is a dynamic range necessary for detection. It is therefore understood that the signal at the level Vy which does not have to be measured is allowed to overflow and regarded as the same intensity.

In the difference image fingertip extracting process, as understood from the images shown in FIGS. 12A to 12D (images A to C and a binarized image of the image C), information such as the position, shape, and size of each of a plurality of objects disposed in the display area 21 in the I/O display panel 20 at the same time and which is in contact with or close to the I/O display panel 20 may be obtained.

With reference to FIGS. 13 to 19, the difference image fingertip extracting process in the case such that an adjacent object is moving as one of feature parts of the present invention will be described in comparison with a comparative example.

In a comparative example shown in FIGS. 13 and 14, as shown by the arrow in FIG. 13, the adjacent object moves above the display area 21 in the I/O display panel 20. Consequently, a positional deviation occurs in a part corresponding to the adjacent object between the reception light output signal Voff (A101) in a shadow image A101 and the reception light output signal Von (B101) in the reflection light using image B101. Due to such positions, not only the inherent signal corresponding to the position of the object but also a spurious signal F101 occur in another position in a difference image C101 (=B101−A101) between the two images A101 and B101 and a reception light detection signal V (C101) (=Von(B101)−Voff (A101)). Therefore, the existence of such spurious signal F101 makes stable detection of the adjacent object difficult.

In contrast, in the embodiment, at the time of generating the difference image C, an interpolation image M corresponding to a shadow image obtained at a timing different from the timings of a plurality of shadow images A obtained at timings different from one another along the time base. By the difference between the interpolation image M and the reflection light using image B, the difference image C is generated. Concretely, on the basis of two shadow images A obtained at timings different from one another along the time base (for example, successive timings), one interpolation image M corresponding to a shadow image obtained at a timing different from the two shadow images A is generated (for example, a timing between the two shadow images).

Figure 16:
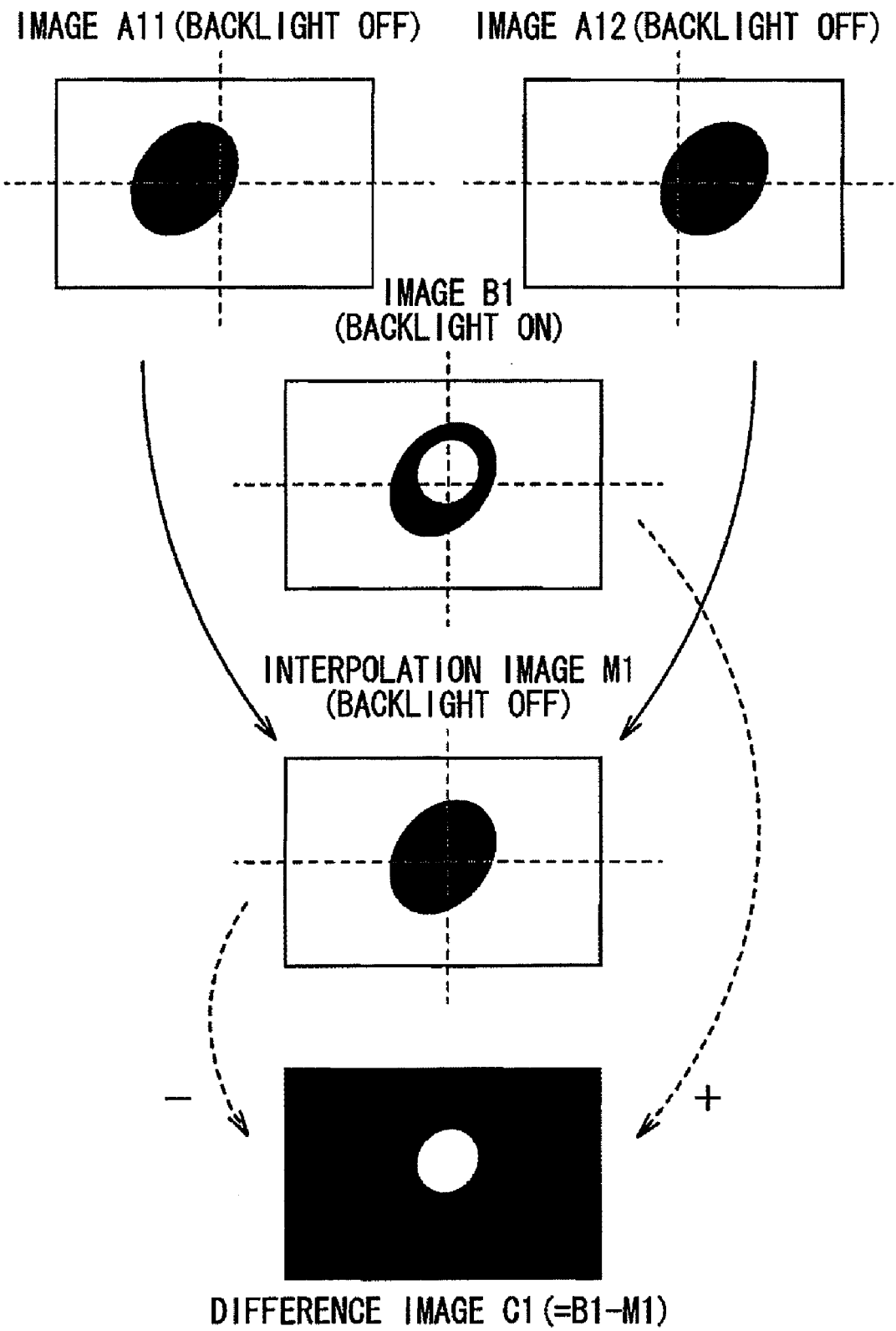
FIG. 16 is a schematic diagram for explaining the difference image fingertip extracting process in the first embodiment.

More concretely, for example, as shown in FIGS. 15A and 15B and FIG. 16, under circumstances of strong external light and a moving adjacent object, on the basis of the two shadow images A11 and A12 captured at successive timings along the time base and the reflection light using image B1, process of generating the interpolation image M1 and the difference image C1 as described below is performed. Specifically, on the basis of the two shadow images A11 and A12 captured at successive timings along the time base, the interpolation image M1 corresponding to a shade image captured at a timing between the two shadow images A11 and A12 is generated. By obtaining the difference between the interpolation image M1 and the reflection light using image B1 obtained at a timing between the two shadow images A11 and A12 (a timing corresponding to the interpolation image M1), the difference image C1 (=B1−M1) is generated. In expression of reception light detection signals, for example, as shown in FIGS. 15A and 15B, on the basis of the reception light output signal Voff(A11) in the shadow image A11 and the reception light output signal Voff(A12) in the shadow image A12, a reception light output signal Voff(M1) in the interpolation image M1 is generated. By the difference between the reception light output signal Voff(M1) and a reception light output signal Von(B1) in the refection light using image B1, a reception light detection signal V(C1) (=Von(B1)−Voff(M1)) is generated. Since the on/off operation of the backlight is performed in extremely short time, in this case, the motion of the adjacent object can be regarded as almost linear uniform motion.

Figure 17:
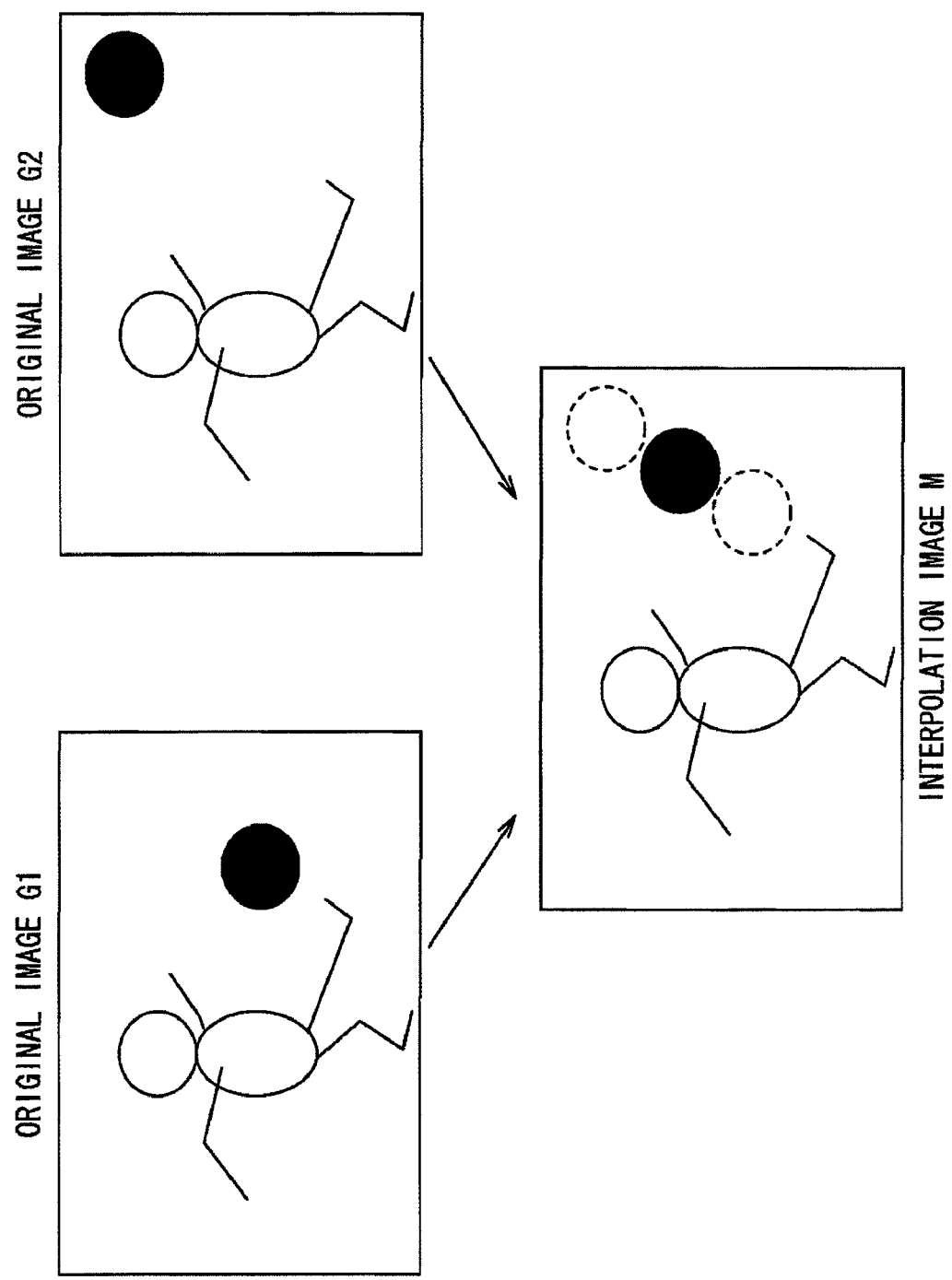
FIG. 17 is a diagram for explaining an interpolation image generating process using motion compensation.
Figure 18:
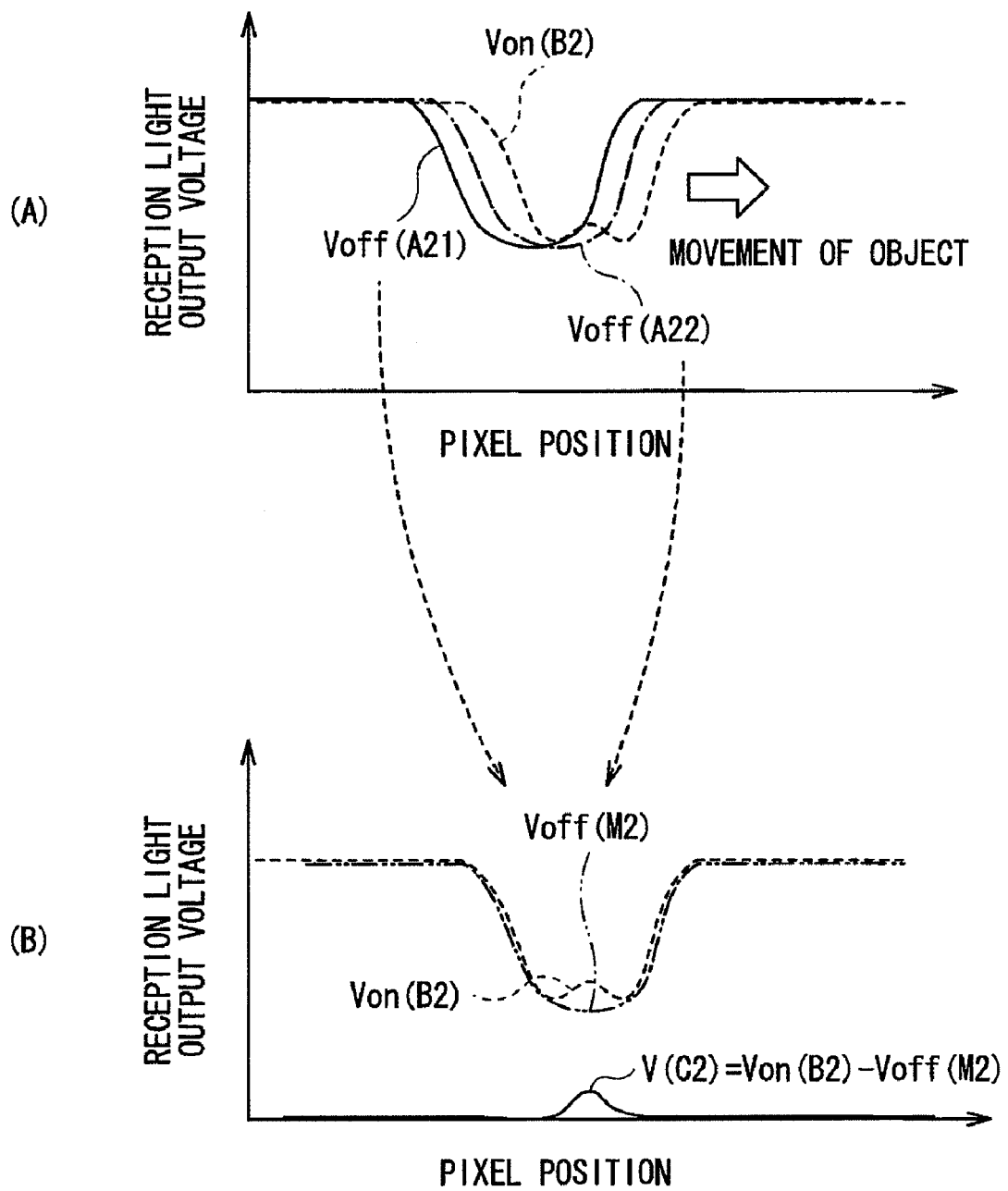
FIG. 18 is a characteristic diagram for explaining a difference image fingertip extracting process as a modification of the first embodiment.

The interpolation image M is generated by, for example, as shown in FIG. 17, motion compensation using motion vectors in two original images G1 and G2 (in the embodiment, two shadow images). Concretely, by tracing the motion of the shadow of the adjacent object, the interpolation image M at the same time is estimated by an image process. More concretely, mainly, by finding feature points in the two original images G1 and G2, associating the feature points with each other, and calculating the positions of the feature points in an image to be interpolated, the interpolation image M is generated.

In such a manner, on the basis of the difference image C1 using the interpolation image M1, information of at least one of the position, shape, and size of the adjacent object is obtained. Consequently, for example, even in the case where the adjacent object moves above the display area 21 in the I/O display panel 20, occurrence of spurious signal in the difference image C is suppressed (or avoided).

Figure 19:
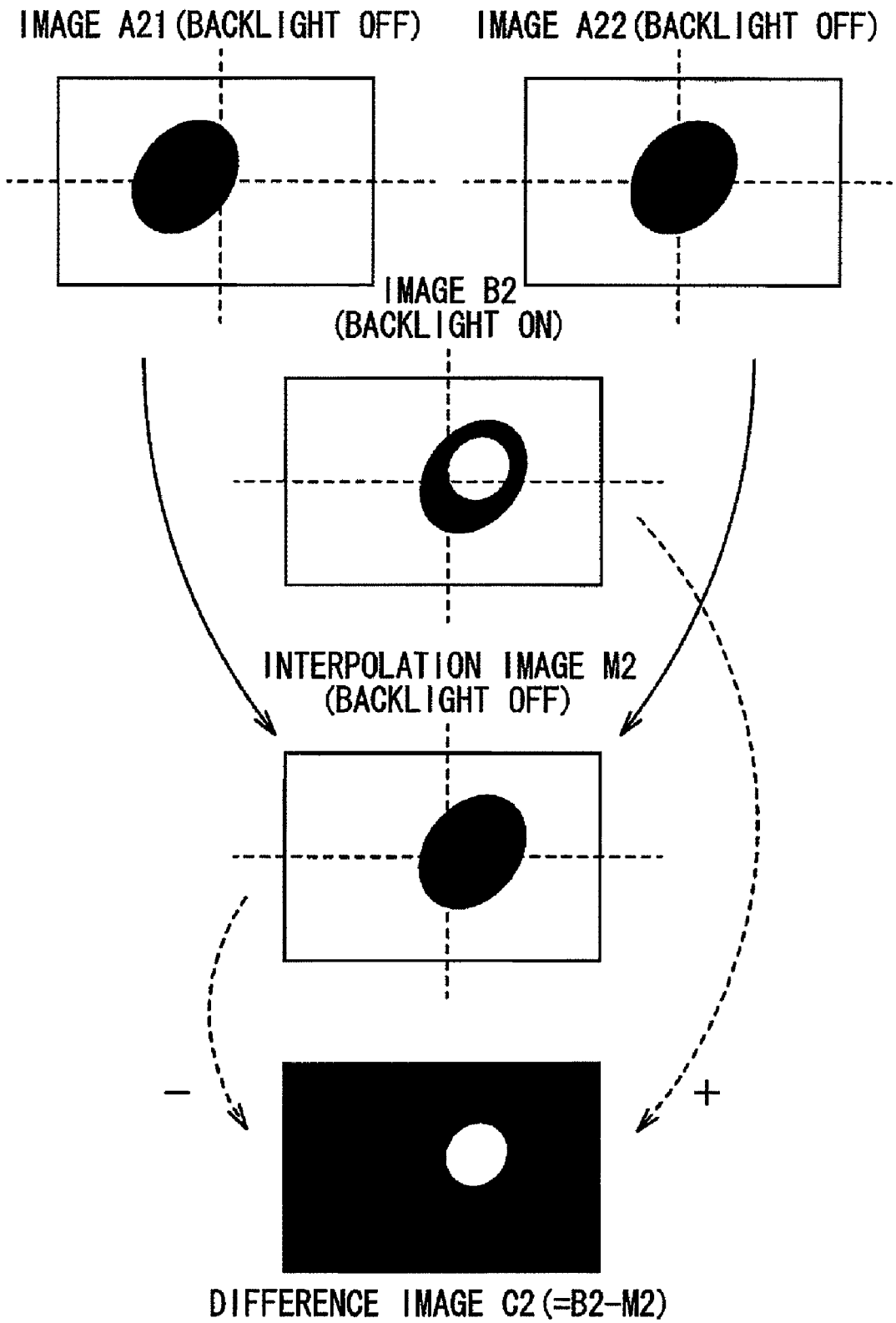
FIG. 19 is a schematic diagram for explaining the difference image fingertip extracting process as a modification of the first embodiment.

For example, as shown in FIGS. 18A, 18B, and 19, on the basis of two shadow images A21 and A22 obtained at timings different from one another (in this case, successive timings) along the time base, one interpolation image M2 corresponding to a shadow image obtained at a timing before or after the two shadow images A21 and A22 along the time base (in this case, a subsequent timing) is generated. By obtaining the difference between the interpolation image M2 and a reflection light using image B2 obtained at a timing corresponding to the interpolation image M2, a difference image C2 (=B2−M2) may be generated. In this case, in expression of reception light detection signals, for example, as shown in FIGS. 18A and 18B, on the basis of a reception light output signal Voff (A21) in the shadow image A21 and a reception light output signal Voff(A22) in the shadow image A22, a reception light output signal Voff(M2) in the interpolation image M2 is generated. By the difference between the reception light output signal Voff(M2) and a reception light output signal Von(B2) in the refection light using image B2, a reception light detection signal V(C2) (=Von(B2)−Voff(M2)) is generated. In this case, one interpolation image M2 corresponding to a shadow image obtained at a timing after the two shadow images A21 and A22 along the time base is estimated. In most of the cases, the motion of the adjacent object may be regarded as almost linear uniform motion, there is no problem. According to the method, by turning on the backlight at the latest time, time since acquisition of the reception light detection signal until detection of the object and driving of the application becomes the shortest. Therefore, reaction time of the system may be shortened.

As described above, in the embodiment, at the time of generating the difference image C, on the basis of a plurality of shadow images A captured at timings different from one another along the time base, one interpolation image M corresponding to a shadow image obtained at a timing different from any of the plurality of shadow images A is generated. By the difference between the interpolation image M and the reflection light using image B, the difference image C is generated. For example, even in the case where the adjacent object moves above the display area 21 in the I/O display panel 20, occurrence of spurious signal in the difference image C may be suppressed. Therefore, regardless of the use circumstances, an object may be stably detected.

Second Embodiment

A second embodiment of the present invention will now be described.

In the foregoing first embodiment, the case of generating one interpolation image M by using the motion compensation on the plurality of shadow images A has been described. In the second embodiment, without using such motion compensation, an interpolation image (synthetic image) is generated. Since the other configuration and operation are similar to those of the first embodiment, their description will not be repeated.

Figure 20:
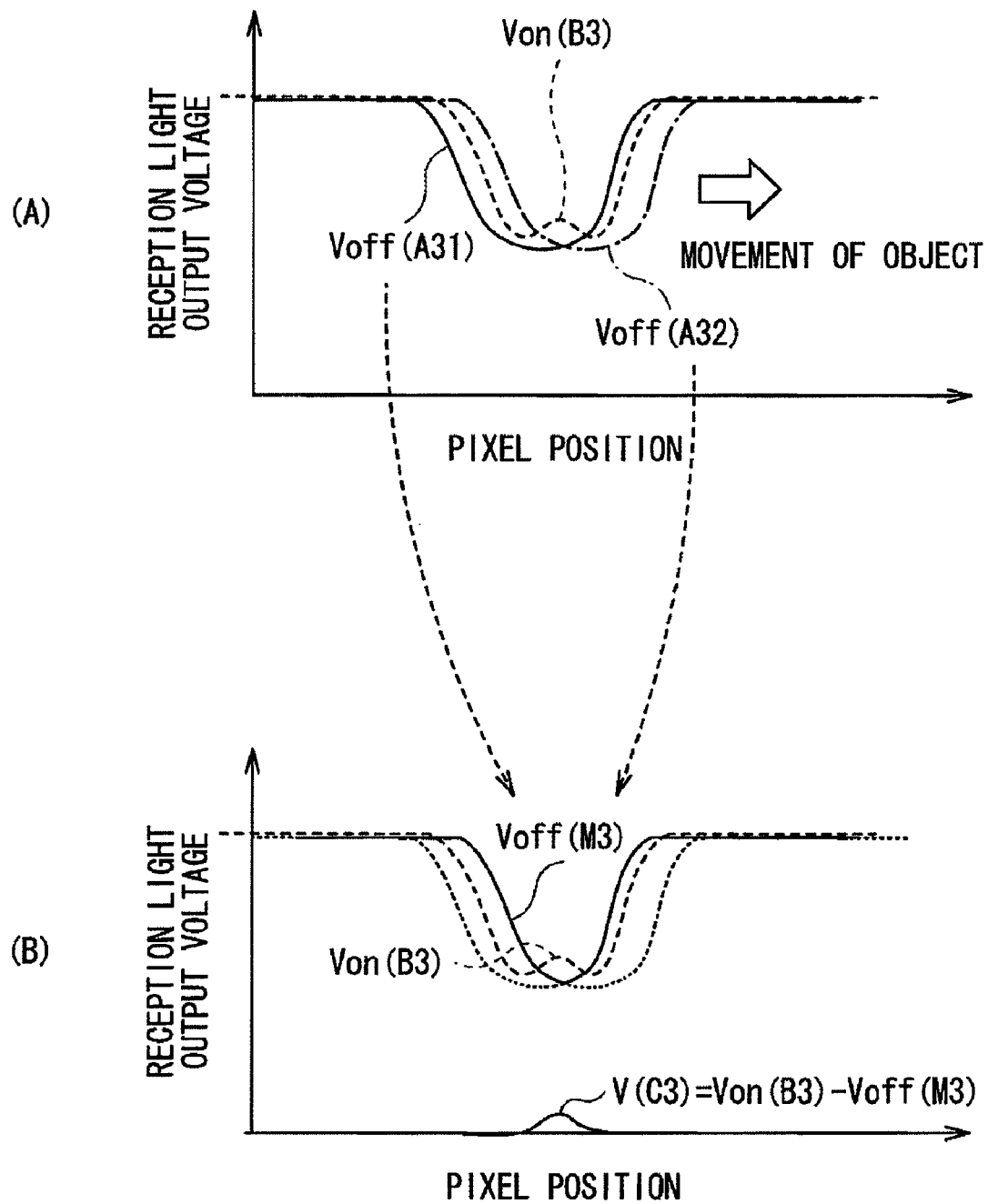
FIG. 20 is a characteristic diagram for explaining a difference image fingertip extracting process in a second embodiment.
Figure 21:
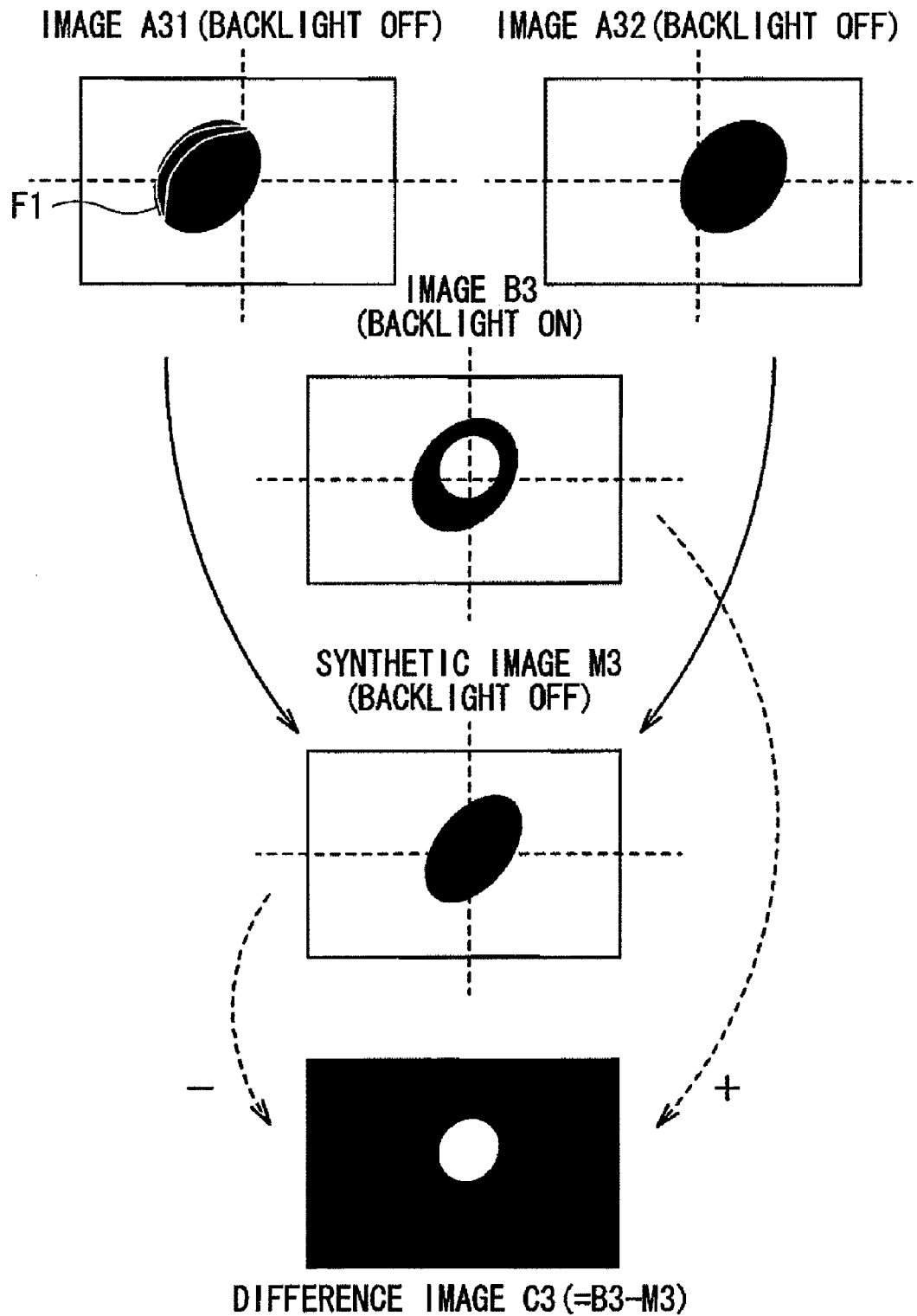
FIG. 21 is a schematic diagram for explaining the difference image fingertip extracting process in the second embodiment.

Concretely, for example, as shown in FIGS. 20A, 20B, and 21, a displaying and imaging apparatus of the second embodiment generates an interpolation image (synthetic image M3) corresponding to a shadow image obtained at a timing between two shadow images A31 and A32 on the basis of the two shadow images A31 and A32 captured at successive timings along the time base. By selecting a pixel having higher brightness (brighter pixel) in the pixels of the two shadow images A31 and A32, an interpolation image (synthetic image M3) corresponding to a shadow image obtained at a timing between the two shadow images A31 and A32 is generated for the following reason. As shown by reference numeral F1 in FIG. 21, the spurious signal occurs since a shade positioned on the outside of the shadow in the synthetic image M3 exists in the shadow image A31. In spite of the fact that external light is applied when the backlight is on state, this portion was in the shadow when the backlight was off. Consequently, when the difference is calculated, the external light remains and is erroneously detected as a reflection signal of the adjacent object.

Therefore, the synthetic image M3 is obtained as described above, and information of at least one of the position, shape, and size of the adjacent object is obtained on the basis of a difference image C3 using the synthetic image M3. In a manner similar to the first embodiment, even in the case where the adjacent object moves above the display area 21 in the I/O display panel 20, occurrence of spurious signal in the difference image C3 is suppressed (or avoided). In expression of reception light detection signals, for example, as shown in FIGS. 20A and 20B, on the basis of a reception light output signal Voff(A31) in the shadow image A31 and a reception light output signal Voff(A32) in the shadow image A32, a reception light output signal Voff(M3) in the synthetic image M3 is generated. By the difference between the reception light output signal Voff(M3) and a reception light output signal Von(B3) in the refection light using image B3, a reception light detection signal V(C3) (=Von(B3)−Voff(M3)) is generated.

As described above, in the second embodiment, at the time of generating the difference image, by selecting a pixel having higher brightness (brighter pixel) in the pixels of the two shadow images A31 and A32 obtained at successive timings, an interpolation image (synthetic image M3) corresponding to a shadow image obtained at a timing between the two shadow images A31 and A32 is generated, and the difference image C3 is generated by the difference between the synthetic image M3 and the reflection light using image B3. Consequently, by actions similar to those of the first embodiment, similar effects can be obtained. That is, for example, even in the case where the adjacent object moves above the display area 21 in the I/O display panel 20, occurrence of spurious signal in the difference image C can be suppressed. Therefore, regardless of the use circumstances, an object can be stably detected.

Since the second embodiment may be realized by comparing the brightness values on the same coordinates in the two shadow images A31 and A32 and employing only the higher brightness value, the calculation load may be extremely reduced as compared with the first embodiment.

APPLICATION PROGRAM EXECUTION EXAMPLES

Referring now to FIGS. 22A to 22B, and 23 to 25, some examples of execution of an application program by the application program executing unit 11 using positional information and the like of an object detected by the above-described fingertip extracting process will be described.

Figure 22A:
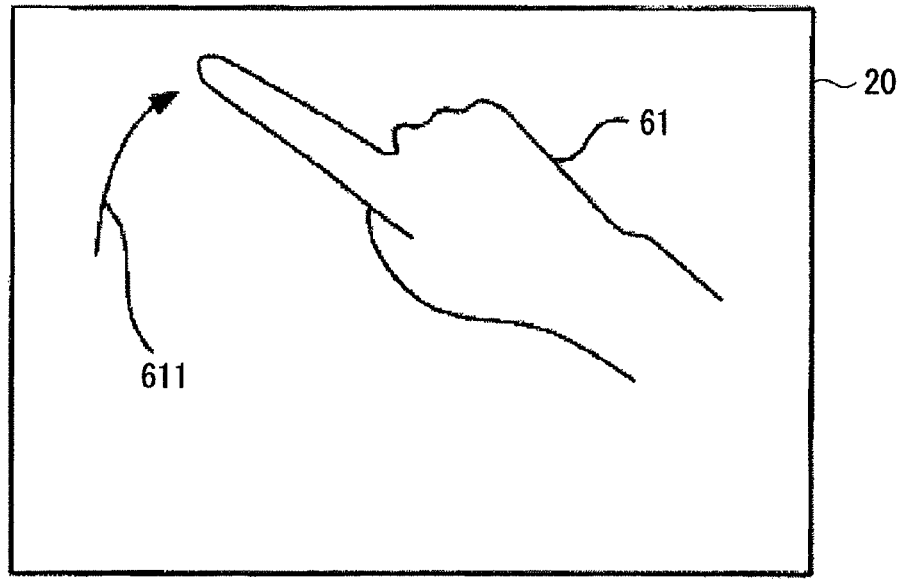
FIGS. 22A and 22B are diagrams for explaining an example of an application using a result of a fingertip extracting process.

First, in the example shown in FIG. 22A, the surface of the I/O display panel 20 is touched with a fingertip 61, and the locus of the touched part is displayed as a drawn line 611 on the screen.

Figure 22B:
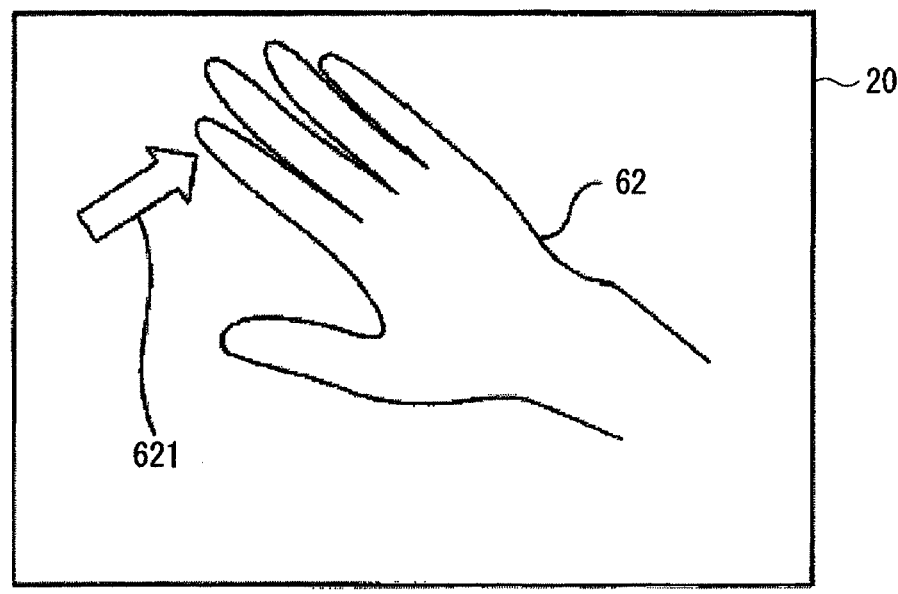

The example shown in FIG. 22B relates to recognition of a gesture using the shape of a hand. Concretely, the shape of a hand 62 touching (or close to) the I/O display panel 20 is recognized. The shape of the hand recognized is displayed as an image. According to movement 621 of the display object, some process is performed.

Figure 23:
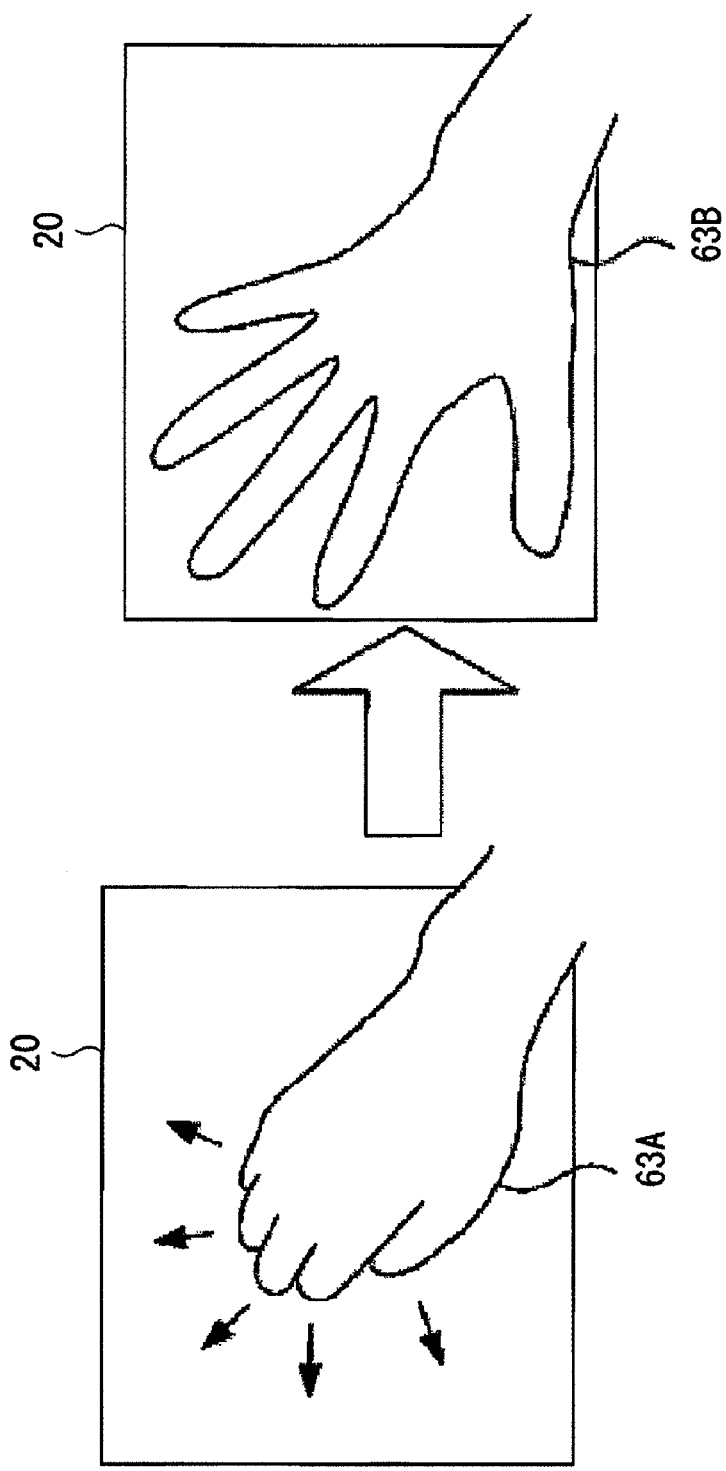
FIG. 23 is a diagram for explaining an example of an application using a result of the fingertip extracting process.

In the example shown in FIG. 23, a hand 63A in a closed state is changed to a hand 63B in an open state. Contact or adjacence of the hand in each of the states is recognized as an image on the I/O display panel 20, and a process based on the image recognition is executed. By performing the process based on the recognitions, an instruction such as zooming-in may be given. Since such an instruction may be given, for example, operations of connecting the I/O display panel 20 to a personal computer and switching commands on the computer may be performed in a more natural form by the image recognitions.

Figure 24:
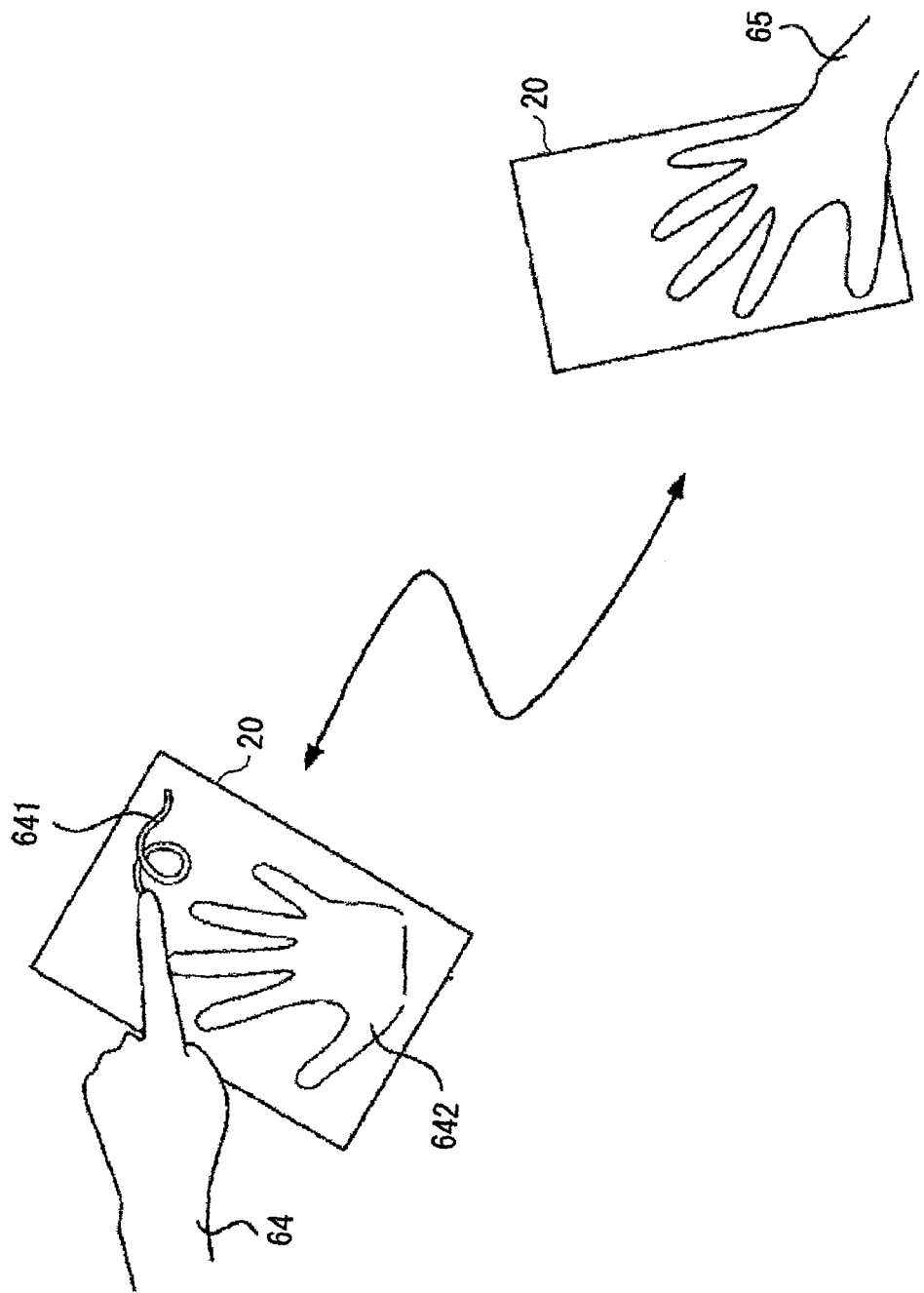
FIG. 24 is a diagram for explaining an example of an application using a result of the fingertip extracting process.

For example, as shown in FIG. 24, by preparing a plurality of I/O display panels 20, connecting the I/O display panels 20 by some transmission means, transmitting an image formed by detecting touch or adjacence to the I/O display panel 20 on the other side, and displaying the image on the I/O display panel 20 on the other side, the users operating the display panels 20 may communicate with each other. Specifically, as shown in FIG. 24, two I/O display panels are prepared. The shape of a hand 65 which is image-recognized by one of the I/O display panels is transmitted to the other I/O display panel, and a hand shape 642 is displayed on the other I/O display panel. A locus 641 of a hand 64 touching the other I/O display panel may be transmitted to the panel of the other user and displayed. In such a manner, by receiving motion pictures of a drawing state and sending back handwritten characters, figures, and the like to the other party, the apparatus of the present invention can be used as a new communication tool. As such an example, it is assumed that the I/O display panel 20 is applied as a display panel of a cellular phone terminal.

Figure 25:
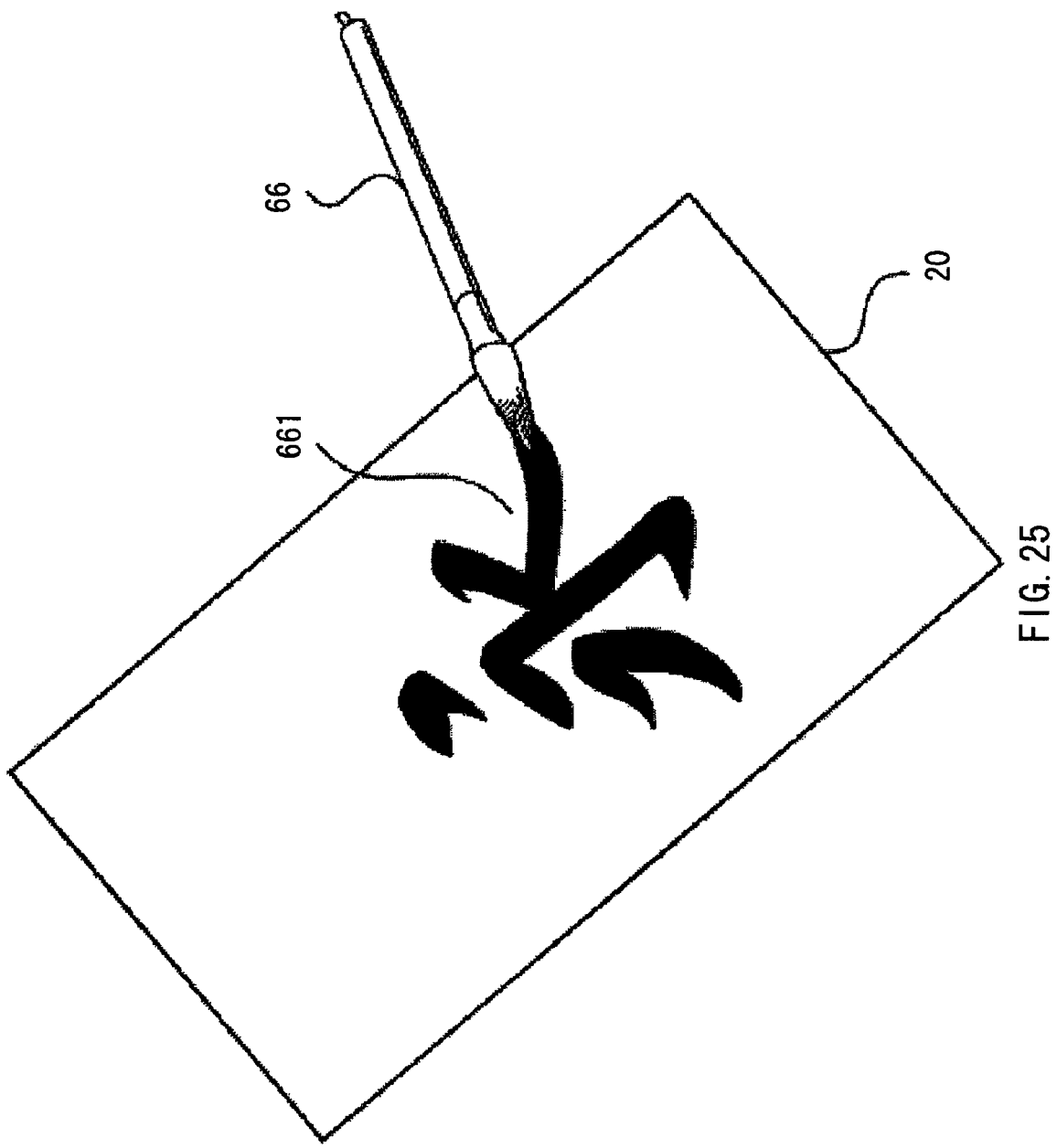
FIG. 25 is a diagram for explaining an example of an application using a result of the fingertip extracting process.

For example, as shown in FIG. 25, a writing brush 66 is used and allowed to touch so as to write a character on the surface of the I/O display panel 20. The part touched with the writing brush 66 is displayed as an image 661 on the I/O display panel 20, thereby enabling handwriting with the writing brush to be entered. In this case, even a fine touch of the writing brush can be recognized and realized. The handwriting recognition of the related art is realized by detecting a tilt of a special pen using an electric field by, for example, a digitizer. In the embodiment, by detecting the contact face of a real writing brush itself, information may be entered in a more realistic manner.

Module and Application Example

With reference to FIGS. 26, 27A to 27B, 28 to 29, and 30A to 30G, an application example of the displaying and imaging apparatus described in the foregoing embodiments will be described. The displaying and imaging apparatus in each of the foregoing embodiments can be applied to electric devices in all of the fields of displaying a video signal input from the outside or an internally generated video signal as an image or a video image, such as a television apparatus, a digital camera, a note-sized personal computer, a portable terminal device such as a cellular phone, a video camera, or the like.

Application Example 1

Figure 26:
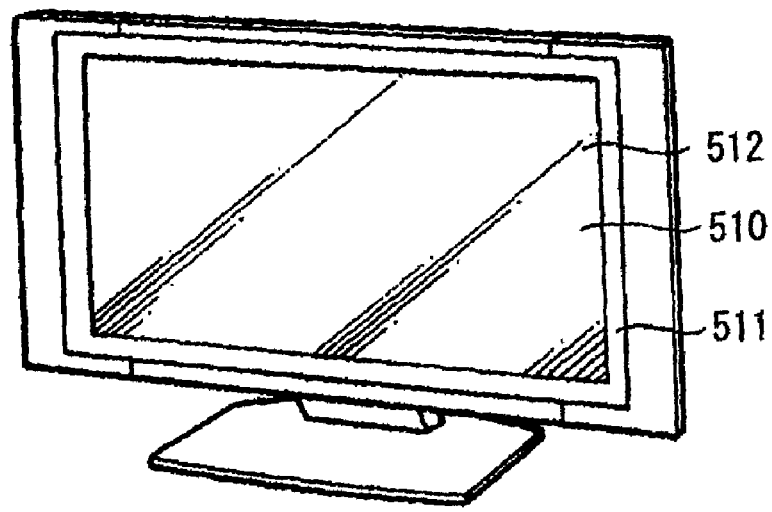
FIG. 26 is a perspective view showing the appearance of an application example 1 of a displaying and imaging apparatus in any of the foregoing embodiments.

FIG. 26 shows the appearance of a television apparatus to which the displaying and imaging apparatus of the foregoing embodiments is applied. The television apparatus has, for example, a video display screen unit 510 including a front panel 511 and a filter glass 512. The video display screen unit 510 is constructed by the displaying and imaging apparatus of any of the foregoing embodiments.

Application Example 2

Figure 27A:
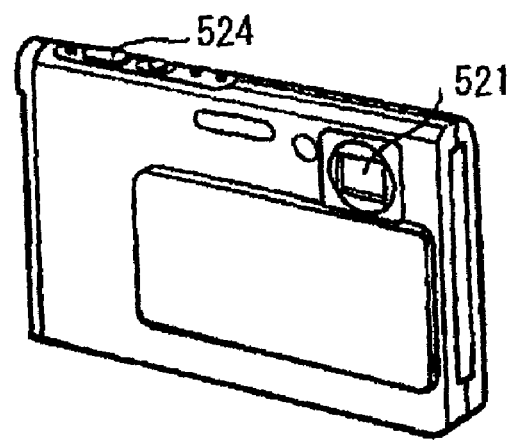
FIG. 27A is a perspective view showing the appearance seen from the surface side of the application 2.
Figure 27B:
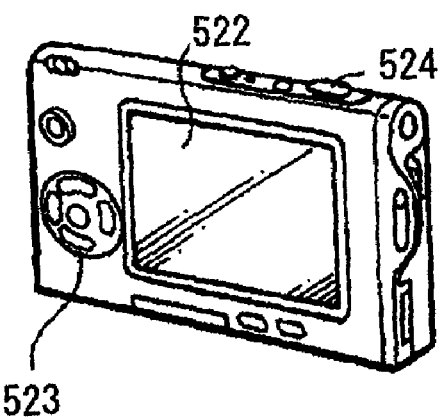
FIG. 27B is a perspective view showing the appearance seen from the back side.

FIGS. 27A and 27B show the appearance of a digital camera to which the displaying and imaging apparatus of any of the foregoing embodiments is applied. The digital camera has, for example, a light emitting part 521 for flash, a display unit 522, a menu switch 523, and a shutter button 524. The display unit 522 is constructed by the displaying and imaging apparatus of any of the embodiments.

Application Example 3

Figure 28:
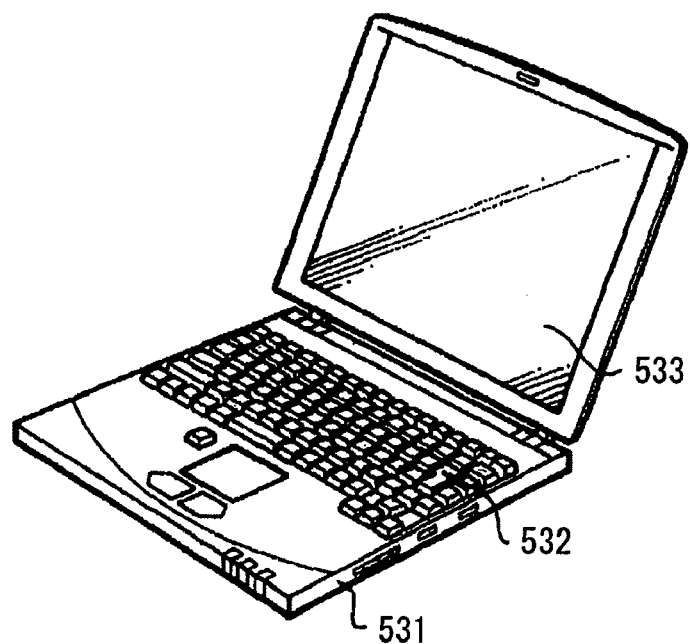
FIG. 28 is a perspective view showing the appearance of an application example 3.

FIG. 28 shows the appearance of a notebook-sized personal computer to which the displaying and imaging apparatus of any of the embodiments is applied. The notebook-sized personal computer has, for example, a body 531, a keyboard 532 for operation of inputting characters and the like, and a display unit 533 for displaying an image. The display unit 533 is constructed by the displaying and imaging apparatus of any of the embodiments.

Application Example 4

Figure 29:
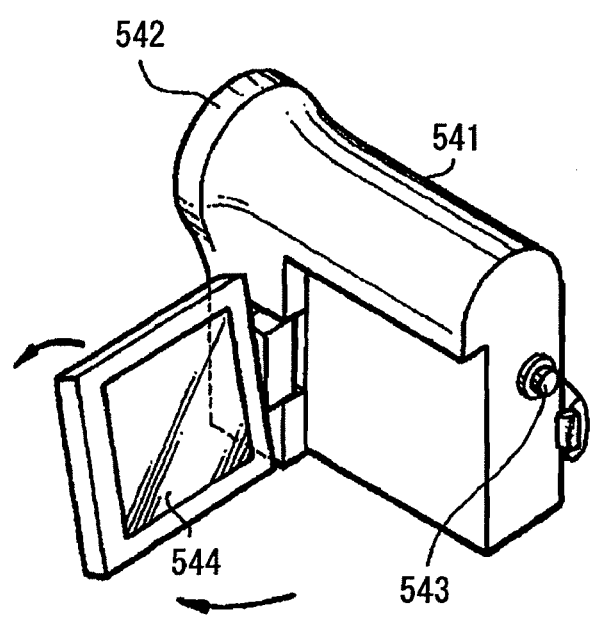
FIG. 29 is a perspective view showing the appearance of an application example 4.

FIG. 29 shows the appearance of a video camera to which the displaying and imaging apparatus of any of the foregoing embodiments is applied. The video camera has, for example, a body 541, a lens 542 for photographing a subject, which is provided on a front face of the body 541, an imaging start/stop switch 543, and a display unit 544. The display unit 544 is constructed by the displaying and imaging apparatus of any of the foregoing embodiments.

Application Example 5

FIGS. 30A to 30G show the appearance of a cellular phone to which the displaying and imaging apparatus of any of the foregoing embodiments is applied. The cellular phone is obtained by, for example, coupling an upper casing 710 and a lower casing 720 via a coupling (hinge) 730, and has a display 740, a sub display 750, a picture light 760, and a camera 770. Each of the display 740 and the sub display 750 is constructed by the displaying and imaging apparatus of any of the foregoing embodiments.

Although the present invention has been described above by the first and second embodiments, the invention is not limited to the embodiments but can be variously modified.

For example, in the foregoing embodiment, the case of generating, on the basis of the two shadow images A obtained at timings different from one another along the time base, one interpolation image M corresponding to a shadow image obtained at a timing different from the two shadow images A has been described. The number of shadow images A used for generating the interpolation image M is not limited to two. One interpolation image M may be generated on the basis of a larger number of (for example, three) shadow images A. With such a configuration, for example, even in the case where the motion of the adjacent object is different from linear uniform motion, the interpolation image M having higher precision can be generated.

In the foregoing embodiment, the case of generating, on the basis of a plurality of shadow images A obtained at timings different from one another along the time base, one interpolation image M corresponding to a shadow image obtained at a timing different from any of the plurality of shadow images A and generating the difference image C by the difference between the interpolation image M and the reflection light using image B has been described. On the contrary, for example, one interpolation image M may be generated on the basis of the plurality of reflection light using images B. Concretely, at the time of generating the difference image C, on the basis of a plurality of reflection light using images B obtained at timings different from one another along the time base, one interpolation image M corresponding to the reflection light using image obtained at a timing different from those of the plurality of reflecting light using images B is generated. The difference image C is generated by the difference between the interpolation image M and the shadow image A. More generally, on the basis of a plurality of images which are the reflecting light using images B or the shadow images A obtained at timings different from one another along the time base, one interpolation image M corresponding to the reflecting light using image or the shadow image obtained at a timing different from any of the plurality of images is generated. The difference image C is generated by the difference between the interpolation image M and the other image out of the reflection light using image and the shadow image.

In the foregoing embodiment, the case where the display element is the liquid crystal element, and the light receiving element is separately provided in the I/O display panel 20 has been described. For example, like in a displaying and imaging apparatus according to a modification shown in FIGS. 31 to 33, an I/O display panel (I/O display panel 80) may be constructed by light emitting/receiving elements (displaying and imaging elements) capable of performing light emitting operation and light receiving operation like organic EL (electroluminescence) elements.

Figure 31:
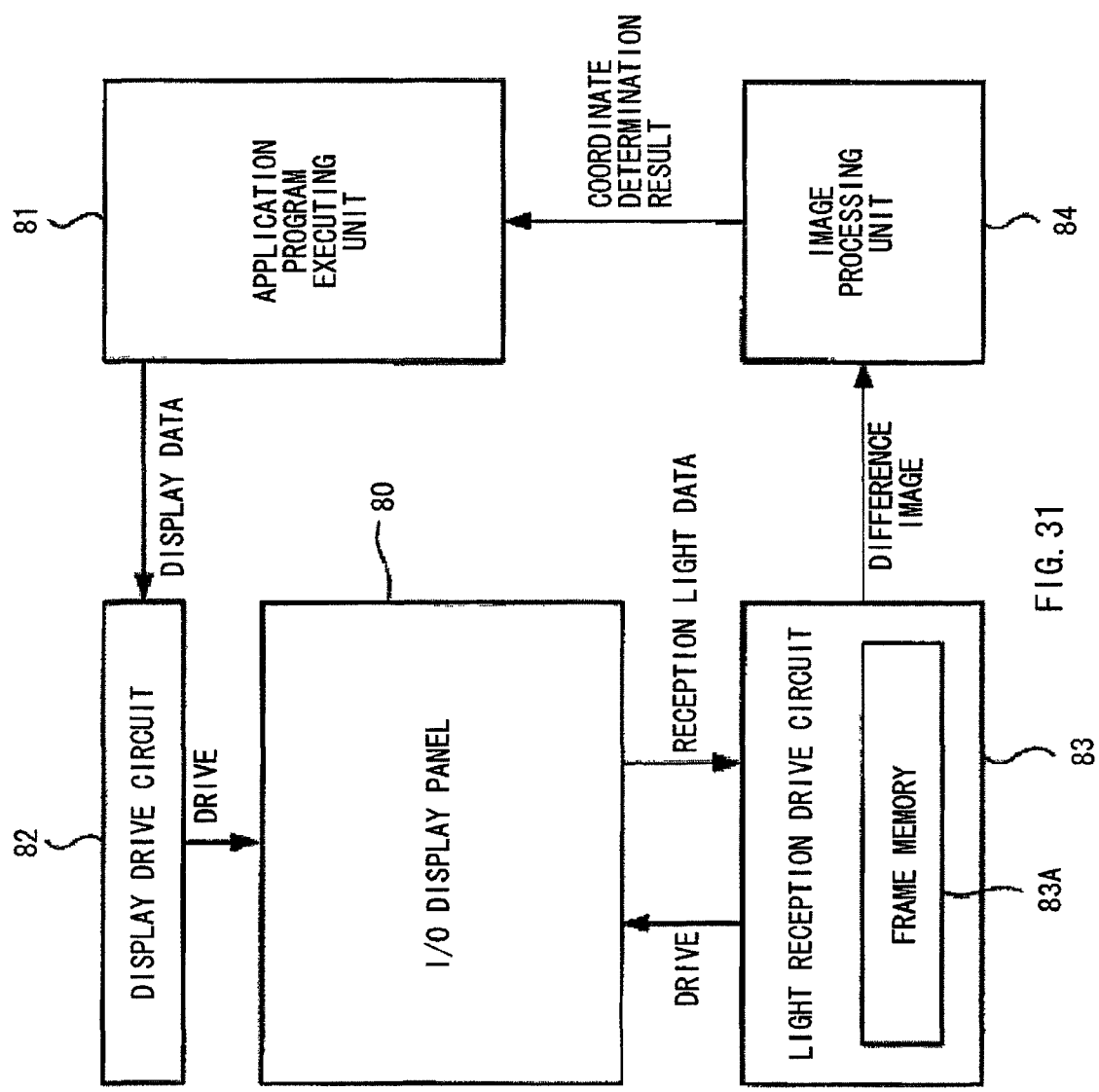
FIG. 31 is a block diagram showing the configuration of a displaying and imaging apparatus as a modification of the invention.

FIG. 31 shows a block diagram of a configuration example of a displaying and imaging apparatus according to the modification. The displaying and imaging apparatus includes an I/O display panel 80, a display drive circuit 82, a light reception drive circuit 83 having a frame memory 83A, an image processing unit 84, and an application program executing unit 81. Among them, the display drive circuit 82, the frame memory 83A, the light reception drive circuit 83, the image processing unit 84, and the application program executing unit 81 perform the same operations as the display drive circuit 12, the frame memory 13A, the light reception drive circuit 13, the image processing unit 14, and the application program executing unit 11 described in the foregoing embodiment, respectively, thereby the descriptions are omitted.

As described above, the I/O display panel 80 is constructed as an organic EL display using organic EL elements, and a plurality of pixels (displaying and imaging elements) are formed in a matrix in a display area (sensor area). In the I/O display panel 80, signal charge accumulated corresponding to the light reception amount in a light receiving period is read by the light reception driving of the light reception drive circuit 83.

Figure 32:
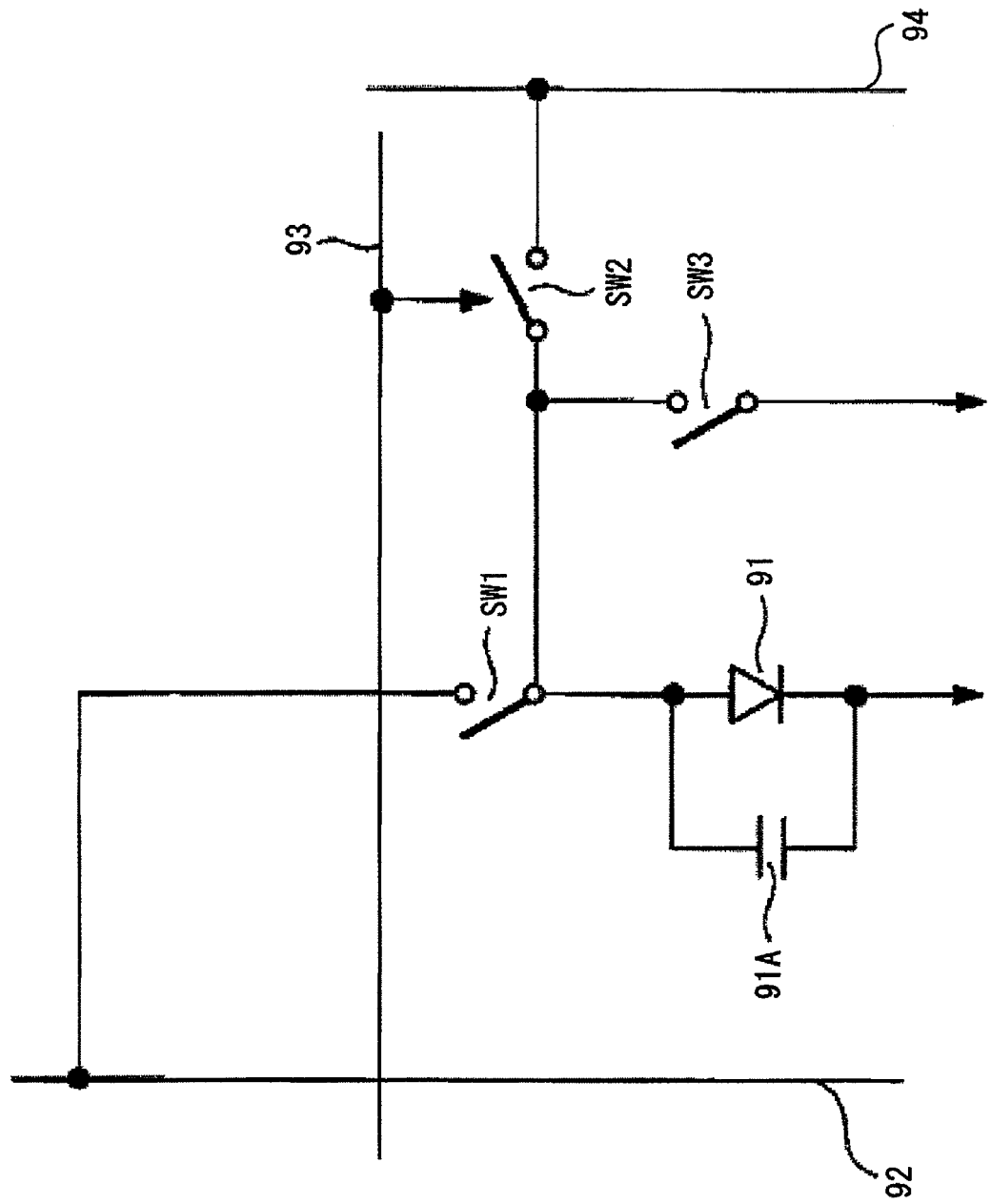
FIG. 32 is a circuit diagram showing a configuration example of each of pixels in the displaying and imaging apparatus illustrated in FIG. 31.

FIG. 32 shows a circuit configuration example (configuration example of a pixel circuit) of each pixel in the displaying and imaging apparatus shown in FIG. 31. The pixel circuit is constructed by an organic EL element 91, a parasitic capacity 91A of the organic EL element 91, switches SW1 to SW3, a display data signal line 92, a read line selection line 93, and a reception data signal line 94. In the pixel circuit, when the switch SW1 is turned on in the display period (light emitting period), the display data for image display is supplied to the organic EL element 91 from the display data signal line 92 through the switch SW1, and the organic EL element 91 performs the light emitting operation. On the other hand, during the period when the light emitting operation stops in the organic EL element 91 (light receiving period), the charge is accumulated in the parasitic capacity 91A generated in the organic EL element 91 according to the light amount of incident light to the sensor area. Then, the switch SW2 is turned on according to the control by the signal obtained from the read line selection line 93, thereby the accumulated charge is read to the reception data signal line 94. In addition, at the start time of the light receiving period, it is necessary that the charge accumulated at the light emitting time is released in the parasitic capacity 91A by turning on the switch SW3 for reset for a moment.

Figure 33:
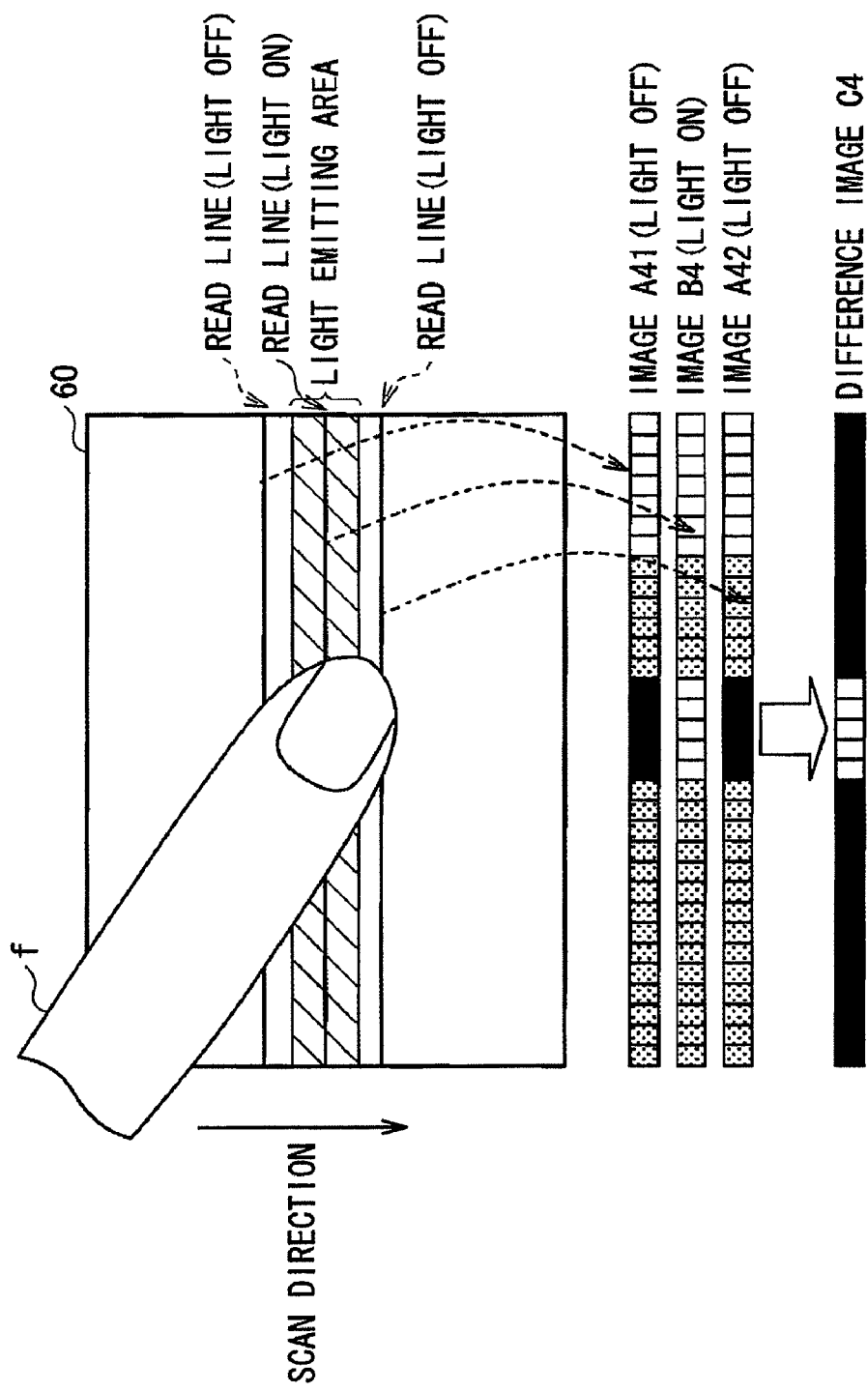
FIG. 33 is a diagram for explaining a difference image fingertip extracting process in the displaying and imaging apparatus illustrated in FIGS. 31 and 32.

FIG. 33 explains the difference image fingertip extracting process in the displaying and imaging apparatus shown in FIGS. 31 and 32. Concretely, the case is shown where, in the I/O display panel 80 using the above-described organic EL elements, while displaying an image or the like, the process of detecting the object (finger f) which is in contact with or close to the I/O display panel 80 is performed. Here, the light emitting area is configured by a plurality of specific parallel lines in a display screen. Such a light emitting area moves, for example, in a scanning direction indicated by arrow in the figure in a field period, thereby it may be seen as a display by the whole display screen by the afterimage effect.

On the other hand, for the reading operation of the light reception signal, the reading operations by the read lines positioned in the light emitting area and by the read lines positioned above and below apart to some extent from the light emitting area are sequentially performed in association with the movement of the light emitting area. Concretely, in the read lines in the light emitting area, the reading operation may detect a reflection light of a light from the light emitting area, and thus the read data in a light-on state (image B4) as shown in FIG. 33 is obtained. On the other hand, in the read lines positioned above and below apart to some extent from the light emitting area, the reading operation is performed without being influenced by the light emitted from the light emitting area, and thus the read data in a light-off state (images A41 and A42) as shown in FIG. 33 are obtained. Therefore, in the modification, as shown in FIG. 33, it is sufficient to generate an interpolation image M4 (not shown) on the basis of images A41 and A42 (corresponding to the shadow image A) obtained in a read line in a light-off state and detect an adjacent object (finger f) by a difference image C4 (=B4−M4) between the interpolation image M4 and the image B4 (corresponding to the reflection light using image B) obtained in the read line in the light-on state. Also in the configuration, effects similar to those of the foregoing embodiments can be obtained.

Obviously many modifications and variations of the present invention are possible in the light of the above teachings. It is therefore to be understood that within the scope of the appended claims the invention may be practiced otherwise than as specifically described.

What is claimed is:

1. A displaying and imaging apparatus comprising:
  a displaying and imaging panel having an image displaying function and an image capturing function;
  a generating unit for generating a difference image between a reflection light using image and a shadow image, the reflection light using image being obtained by imaging of an adjacent object by the displaying and imaging panel using reflection light of irradiation light emitted from the displaying and imaging panel, and the shadow image being obtained by imaging shadow of the adjacent object by the displaying and imaging panel; and
  an image processing unit for obtaining information of at least one of position, shape, and size of the adjacent object on the basis of the difference image, and
  the generating unit generates, on the basis of a plurality of images obtained at timings different from each other along time base, which are one of the reflection light using image or the shadow image, one interpolation image corresponding to the one of images obtained at a timing different from those of the plurality of images, and generates the difference image by the difference between the interpolation image and the other one of the reflection light using image and the shadow image, wherein one of the images is the shadow image, the other image is the reflection light using image, and the generating unit generates, on the basis of a plurality of shadow images obtained at timings different from each other along time base, one interpolation image corresponding to a shadow image obtained at a timing different from those of the plurality of shadow images, and generates the difference image on the basis of the difference between the interpolation image and the reflection light using image, wherein on the basis of two shadow images obtained at timings different from each other along time base, the generating unit generates one interpolation image corresponding to a shadow image obtained at a timing different from those of the two shadow images.

2. The displaying and imaging apparatus according to claim 1, wherein on the basis of two shadow images obtained at successive timings along time base, the generating unit generates one interpolation image corresponding to a shadow image obtained at a timing different from those of the two shadow images.

3. The displaying and imaging apparatus according to claim 2, wherein on the basis of two shadow images obtained at successive timings, the generating unit generates one interpolation image corresponding to a shadow image obtained at a timing between the two shadow images.

4. The displaying and imaging apparatus according to claim 3, wherein by selecting a pixel having higher brightness in pixels of the two shadow images obtained at the successive timings, the generating unit generates one interpolation image corresponding to a shadow image obtained at a timing between the two shadow images.

5. The displaying and imaging apparatus according to claim 1, wherein on the basis of two shadow images obtained at the different timings, the generating unit generates one interpolation image corresponding to a shadow image obtained at a timing between the two shadow images.

6. The displaying and imaging apparatus according to claim 1, wherein on the basis of two shadow images obtained at the different timings, the generating unit generates one interpolation image corresponding to a shadow image obtained at a timing before or after the two shadow images along the time base.

7. The displaying and imaging apparatus according to claim 1, wherein the generating unit generates the one interpolation image by using motion compensation on the plurality of images as the one of the reflection light using images or the shadow images.

8. The displaying and imaging apparatus according to claim 1, wherein the generating unit generates the difference image by the difference between the interpolation image and the other image when the adjacent object moves on/above the displaying and imaging panel.

9. The displaying and imaging apparatus according to claim 1, wherein the image processing unit obtains information on at least one of position, shape, and size of each of a plurality of adjacent objects positioned simultaneously on the displaying and imaging panel.

10. The displaying and imaging apparatus according to claim 1, wherein information on at least one of position, shape, and size of the adjacent object obtained is displayed on the displaying and imaging panel.

11. The displaying and imaging apparatus according to claim 1, wherein the displaying and imaging panel includes a plurality of liquid crystal elements and a plurality of image pickup elements.

12. The displaying and imaging apparatus according to claim 1, wherein the displaying and imaging panel includes a plurality of displaying and imaging elements capable of performing light emitting operation and light receiving operation in a time division manner.

13. The displaying and imaging apparatus according to claim 12, wherein the displaying and imaging element is an organic EL element.

14. An object detecting method comprising:

capturing an image of a shade of an adjacent object by a displaying and imaging panel having an image displaying function and an image capturing function;

capturing an image of the adjacent object by the displaying and imaging panel using reflection light of irradiation light emitted from the displaying and imaging panel;

generating a difference image between an reflection light using image obtained by imaging using the reflection light of the irradiation light and a shadow image obtained by imaging of the shadow of the adjacent object;

obtaining information of at least one of position, shape, and size of the adjacent object on the basis of the difference image; and at the time of generating the difference image, on the basis of a plurality of images obtained at timings different from each other along time base, the plurality of images being one of the reflection light using images and the shadow images, generating one interpolation image corresponding to the one of the images obtained at a timing different from those of the plurality of images, and generating the difference image by the difference between the interpolation image and the other one of the reflection light using image and the shadow image, wherein one of the images is the shadow image, the other image is the reflection light using image, and generating the difference image further generates, on the basis of a plurality of shadow images obtained at timings different from each other along time base, one interpolation image corresponding to a shadow image obtained at a timing different from those of the plurality of shadow images, and generates the difference image on the basis of the difference between the interpolation image and the reflection light using image, wherein on the basis of two shadow images obtained at timings different from each other along time base, generating the difference image further generates one interpolation image corresponding to a shadow image obtained at a timing different from those of the two shadow images.

* * * * *